US011333778B2

(12) United States Patent
Moldoveanu

(10) Patent No.: US 11,333,778 B2
(45) Date of Patent: May 17, 2022

(54) MARINE SEISMIC ACQUISITION SYSTEM

(71) Applicant: WesternGeco LLC, Houston, TX (US)

(72) Inventor: Nicolae Moldoveanu, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 347 days.

(21) Appl. No.: 16/089,039

(22) PCT Filed: Mar. 24, 2017

(86) PCT No.: PCT/US2017/023938
§ 371 (c)(1),
(2) Date: Sep. 27, 2018

(87) PCT Pub. No.: WO2017/172504
PCT Pub. Date: Oct. 5, 2017

(65) Prior Publication Data
US 2019/0107639 A1    Apr. 11, 2019

Related U.S. Application Data

(60) Provisional application No. 62/316,101, filed on Mar. 31, 2016.

(51) Int. Cl.
*G01V 1/18*    (2006.01)
*G01V 1/20*    (2006.01)
*G01V 1/38*    (2006.01)

(52) U.S. Cl.
CPC .............. *G01V 1/189* (2013.01); *G01V 1/20* (2013.01); *G01V 1/38* (2013.01); *G01V 1/3826* (2013.01);
(Continued)

(58) Field of Classification Search
CPC ........ G01V 1/189; G01S 5/0205; G01S 19/14
See application file for complete search history.

(56) References Cited

U.S. PATENT DOCUMENTS 981,367 A * 1/1911 Brackett ................. B64C 39/08
244/13
2,839,735 A * 6/1958 Van Atta .............. G10K 11/205
367/6
(Continued)

FOREIGN PATENT DOCUMENTS

WO    2005073758 A1    8/2005
WO    WO-2011106237 A2 *    9/2011    ........... G01V 1/3852
(Continued)

OTHER PUBLICATIONS

International Preliminary Report on Patentability issued in the related PCT Application PCT/US2017/023938, dated Oct. 11, 2018(12 pages).
(Continued)

*Primary Examiner* — Isam A Alsomiri
*Assistant Examiner* — Abdallah Abulaban
(74) *Attorney, Agent, or Firm* — Fletcher Yoder, PC

(57) ABSTRACT

A marine seismic acquisition system includes a frame that includes a central longitudinal axis and members that define orthogonal planes that intersect along the central longitudinal axis; a data interface operatively coupled to the frame; hydrophones operatively coupled to the frame; a buoyancy engine operatively coupled to the frame where the buoyancy engine includes at least one mechanism that controls buoyancy of at least the frame, the hydrophones and the buoyancy engine; and at least one inertial motion sensor operatively coupled to the frame that generates frame orientation
(Continued)

data, where the hydrophones, the buoyancy engine and the at least one inertial motion sensor are operatively coupled to the data interface.

17 Claims, 15 Drawing Sheets

(52) U.S. Cl.
CPC ...... *G01V 1/3835* (2013.01); *G01V 2001/207* (2013.01); *G01V 2210/144* (2013.01)

(56) References Cited

U.S. PATENT DOCUMENTS

| | | | | |
|---|---|---|---|---|
| 3,794,965 | A * | 2/1974 | Charske | B63G 8/42 367/18 |
| 4,870,625 | A * | 9/1989 | Young | G01V 1/201 367/16 |
| 6,847,896 | B1 | 1/2005 | Orban et al. | |
| 7,411,863 | B2 * | 8/2008 | Toennessen | H01M 4/926 367/20 |
| 8,104,346 | B2 | 1/2012 | Paulson | |
| 2007/0223306 | A1 | 9/2007 | Toennessen | |
| 2012/0327741 | A1 | 12/2012 | Pearce | |
| 2014/0200820 | A1 * | 7/2014 | El Yadari | G01V 1/364 702/17 |
| 2014/0241124 | A1 * | 8/2014 | Bloor | G01V 1/38 367/24 |
| 2014/0269182 | A1 * | 9/2014 | Parkes | G01V 1/3861 367/24 |
| 2014/0321239 | A1 | 10/2014 | Robertsson et al. | |
| 2015/0160356 | A1 * | 6/2015 | Friedly | G01V 1/168 175/19 |
| 2016/0003957 | A1 | 1/2016 | Norris et al. | |

FOREIGN PATENT DOCUMENTS

| | | | |
|---|---|---|---|
| WO | WO-2014161044 A1 * | 10/2014 | G01V 1/137 |
| WO | WO2015113031 A1 | 7/2015 | |
| WO | 2015195939 A1 | 12/2015 | |
| WO | 2016007505 A1 | 1/2016 | |

OTHER PUBLICATIONS

Leaney, Parametric Wavefield Decomposition And Applications, 1990 SEG Annual Meeting, Sep. 23-27, San Francisco, California (4 pages).

Scott et al., Parametric Decomposition of Offset VSP Wave Fields, 1989 SEG Annual Meeting, Oct. 29- Nov. 2, Dallas, Texas (4 pages).

Caprioli et al., Processing considerations for seismic data acquired with wave gliders towing a 3D sensor array, SEG Technical Program Expanded Abstracts 2016 (pp. 235-239).

Caprioli et al., Combination of multi-component streamer pressure and vertical particle velocity: theory and application to data, SEG Technical Program Expanded Abstracts 2012 (pp. 1-5).

Hallock et al., Resonant transducers for solid-state plasma density modulation, Rev Sci Instrum. Apr. 2016; 87(4) (10 pages).

International Search Report and Written opinion issued in the related PCT Application PCT/US2017/023938, dated Jul. 7, 2017 (13 pages).

Extended Search Report issued in the related EP Application EP17776341.4 dated Oct. 11, 2019 (10 pages).

European Office Action; Application No. 17776341.1; dated Sep. 3, 2020.

Nick Moldoveanu et al: "Marine seismic acquisition with autonomous marine vehicles towing 3D sensor arrays", The Leading Edge, vol. 36, No. 7, Jul. 1, 2017 (Jul. 1, 2017 ), pp. 558-565, XP055725922, US ISSN: 1070-485X, DOI: 10.1190/tle36070558.1.

Charles Sicking et al: "Processing considerations for seismic data acquired with wave gliders towing a 3D sensor array", SEG Technical Program Expanded Abstracts 2016, Sep. 1, 2016 (Sep. 1, 2016 ), pp. 235-239, XP055725904, DOI: 10.1190/segam2016-13865271.1.

Office Action issued in the related MX Application No. MX/a/2018/011963 dated Jun. 1, 2021, 10 pages.

* cited by examiner

MARINE SEISMIC ACQUISITION SYSTEM

RELATED APPLICATION

This application claims priority to and the benefit of a U.S. Provisional Application having Ser. No. 62/316,101, filed 31 Mar. 2016, which is incorporated by reference herein.

BACKGROUND

Reflection seismology finds use in geophysics to estimate properties of subsurface formations. Reflection seismology may provide seismic data representing waves of elastic energy, as transmitted by P-waves and S-waves, in a frequency range of approximately 1 Hz to approximately 100 Hz. Seismic data may be processed and interpreted to understand better composition, fluid content, extent and geometry of subsurface rocks.

SUMMARY

A marine seismic acquisition system includes a frame that includes a central longitudinal axis and members that define orthogonal planes that intersect along the central longitudinal axis; a data interface operatively coupled to the frame; hydrophones operatively coupled to the frame; a buoyancy engine operatively coupled to the frame where the buoyancy engine includes at least one mechanism that controls buoyancy of at least the frame, the hydrophones and the buoyancy engine; and at least one inertial motion sensor operatively coupled to the frame that generates frame orientation data, where the hydrophones, the buoyancy engine and the at least one inertial motion sensor are operatively coupled to the data interface. Various other systems, devices, methods, etc. are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Seismic exploration involves surveying subterranean geological formations for hydrocarbon deposits. A seismic survey may involve deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (geophones, accelerometers), and industrial surveys may deploy one type of sensors or both. In response to the detected seismic events, the sensors generate electrical signals to produce seismic data. Analysis of the seismic data can then indicate the presence or absence of probable locations of hydrocarbon deposits.

Some surveys include long streamers (as long as 8 kilometers or more), and may have eight or more streamers towed adjacent to one another. Vessels that tow those streamers are generally large and 30 meters long or more and have a substantial crew. With large vessels of this character, entanglement or other negative interaction with obstacles may be problematic, and can in some cases prevent surveys from being performed in certain areas. Also, cost of operation can be relevant.

Marine surveys may be performed in various marine environments. In a marine survey, unmanned marine vessels, such as autonomously operated vehicles (AOVs) or remotely operated vehicles (ROVs), may be used to gather seismic data from one or more seismic sensors. These seismic sensors may be attached to vertical seismic streamers deployed from the unmanned marine vessels, which may allow for more effective removal of ghost signals and measurement of propagation speed when compared with more conventional horizontal streamers towed by larger vessels.

Figure 1A:
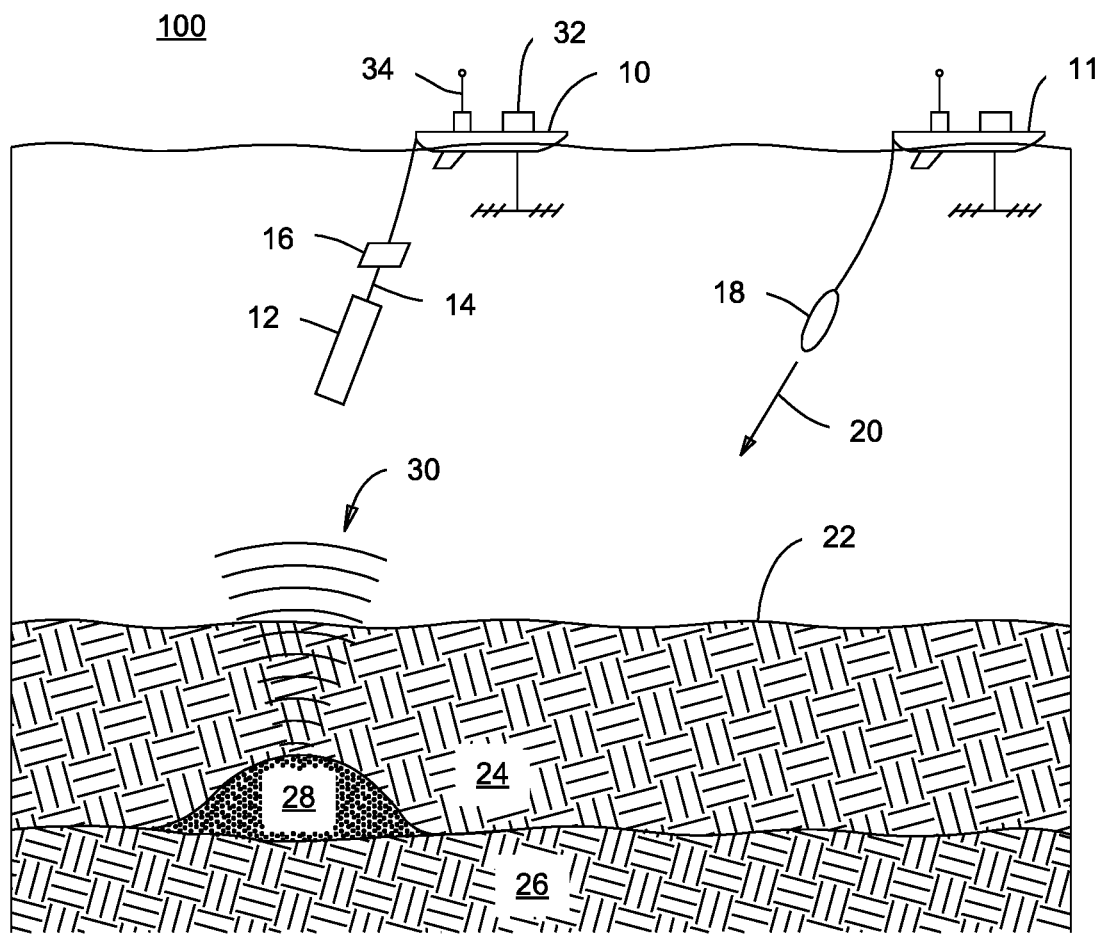
FIGS. 1A and 1B illustrate diagrams of systems for acquiring seismic survey data using a multi-dimensional seismic sensor array coupled to an unmanned marine vessel.
Figure 1B:
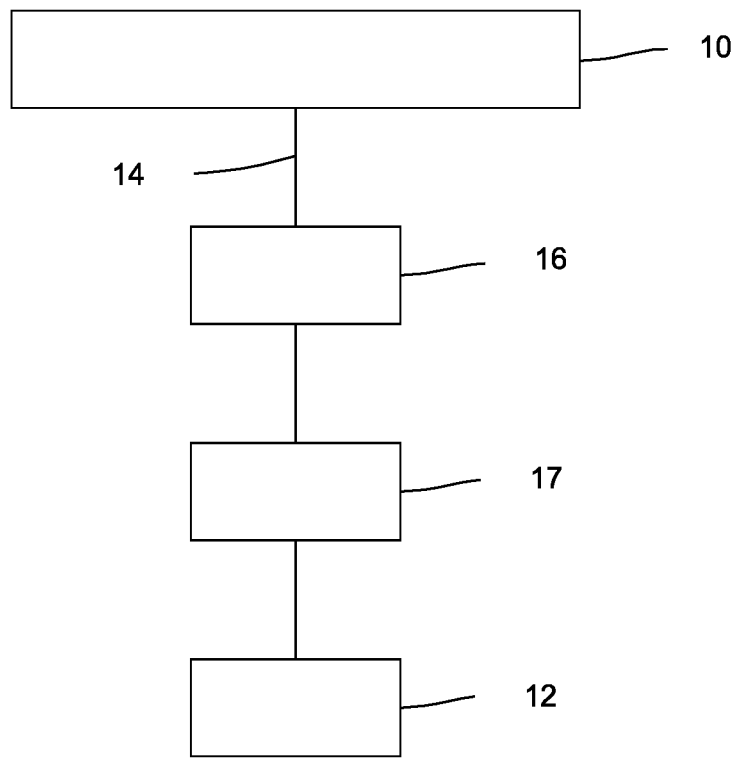

FIGS. 1A and 1B illustrate schematic diagrams of systems 100 and 101 for acquiring seismic survey data in accordance with implementations of various techniques. In particular, FIG. 1A illustrates a diagram of a system 100 for acquiring seismic survey data using a multi-dimensional seismic sensor array 12 coupled to an unmanned marine vessel 10, and FIG. 1B illustrates another diagram of a system 101 for coupling the multi-dimensional seismic sensor array 12 to the unmanned marine vessel 10 with a force decoupling mechanism 17.

The systems 100 and/or 101 may include at least one unmanned marine vessel 10 that may be adapted to descend through a water column or may be adapted for movement on a sea surface via a thrust or propulsion mechanism. The unmanned marine vessel 10 may include an autonomously operating vehicle (AOV) or a remotely operating vehicle (ROV) maneuvering on the sea surface, such as a wave glider or a hybrid water vehicle. A wave glider may be configured to harness wave energy to impart motion to the wave glider. A hybrid water vehicle may be configured to combine mechanical propulsion methods with energy harvesting principles, such as the energy harvesting principles used by wave gliders. The unmanned marine vessel 10 may take the form of one or more other types of marine vessels, such as a diving wave glider, a submarine unmanned marine vessel, a sail buoy, or one or more other implementations.

The unmanned marine vessel 10 may be used for seismic surveying and may include a multi-dimensional seismic sensor array 12. In various implementations, the term multi-dimensional may refer to two-dimensional (2D), three-dimensional (3D), or more than three dimensional, depending on specific implementations. Further, in some implementations, the multi-dimensional seismic sensor array 12 may be referred to as a seismic sensor package having multiple seismic sensors.

In reference to FIG. 1A, the multi-dimensional seismic sensor array 12 may be disposed on a streamer 14 coupled to the unmanned marine vessel 10. The streamer 14 may descend in a generally vertical direction from the unmanned marine vessel 10 into a water column. In one implementation, the streamer 14 may descend to a depth below the sea surface. The streamer 14 may descend 10 meters or greater below the sea surface.

In various implementations, the multi-dimensional seismic sensor array 12 may be coupled to a hull of the unmanned marine vessel 10 via an umbilical cord or a streamer 14. The multi-dimensional seismic sensor array 12 may be configured to acquire seismic survey data and calculate pressure gradients in multiple directions. In some embodiments, the multiple directions may include horizontal and vertical directions. In some other embodiments, the multiple directions may include any or all of x-coordinate, y-coordinate, and z-coordinate directions as in a Cartesian coordinate system.

The multi-dimensional seismic sensor array 12 may include various sensor including pressure sensors, particle motion sensors, and/or multi-component seismic sensors. In reference to multi-component seismic sensors, the multi-dimensional seismic sensor array 12 may be configured to detect a pressure wavefield and at least one component of a particle motion that is associated with acoustic signals that may be proximate to the multi-component seismic sensor. Further, particle motion sensors may include one or more components of a particle displacement, one or more components (inline (x), crossline (y) and vertical (z) components) of a particle velocity and one or more components of a particle acceleration.

In various implementations, multi-component seismic sensors may include one or more geophones, hydrophones, inclinometers, particle displacement sensors, optical sensors, particle velocity sensors, accelerometers, pressure gradient sensors, or combinations thereof. According to some embodiments, a particular multi-component seismic sensor may include three orthogonally-aligned accelerometers (consider a three-component micro-electro-mechanical system (MEMS) accelerometer) to measure three corresponding orthogonal components of particle velocity and/or acceleration near the seismic sensor. According to some embodiments, the MEMS-based accelerometer may be a capacitive MEMS-based sensor. In some implementations, one or more hydrophones that can measure pressure may be used in combination with a three-component MEMS.

A multi-component seismic sensor may be implemented as a single device or as a plurality of devices. A particular multi-component seismic sensor may also include pressure gradient sensors, which constitute another type of particle motion sensors. Each pressure gradient sensor measures the change in the pressure wavefield at a particular point with respect to a particular direction. One of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

The unmanned marine vessel 10 may be deployed to a survey area for seismic surveying. Where the unmanned marine vessel 10 takes the form of an AOV, the unmanned marine vessel 10 may be deployed to a survey area specified on a navigation map. The unmanned marine vessel 10 may automatically make adjustments, if the unmanned marine vessel 10 veers off-course. Where the unmanned marine vessel 10 takes the form of a ROV, the unmanned marine vessel 10 may be deployed to a survey area using remote operation of the unmanned marine vessel's rudder and/or thrust mechanism.

After deploying the unmanned marine vessel 10 to the survey area, a seismic source 18 may be activated to generate acoustic waves 20 that propagate through an ocean bottom surface 22 and into strata 24, 26 beneath the ocean bottom surface. The seismic source 18 may be located on another unmanned marine vessel 11, as shown in FIG. 1A, or more types of source deployments may be used, such as the use of dedicated source vessels. The seismic source 18 may be an air gun, a marine vibrator, or a non-traditional environmentally friendly source. The seismic source may also include drilling induced acoustic pressure waves, passive seismic noise, or production induced acoustic pressure waves, such as those which may result from water or gas injections, or combinations thereof.

Acoustic signals 20 may be reflected from various subterranean geological formations, such as formation 28 depicted in FIG. 1A. The incident acoustic signals 20 produce corresponding reflected acoustic signals, or pressure waves 30, which are sensed by the multi-dimensional seismic sensor array 12. The unmanned marine vessel 10 may record seismic data from over one hundred seismic sensors.

The multi-dimensional seismic sensor array 12 may generate signals called "traces" (information with respect to time), which indicate the acquired measurements of the pressure wavefield and particle motion if the sensors include particle motion sensors. The traces can be recorded and may be passed to a data acquisition system 32 disposed on the unmanned marine vessel 10. The data acquisition system 32 may include a digitizer, a computer system, and a storage system for storing seismic data acquired during the survey.

The storage system may include memory, such as a hard disk drive, a solid-state drive, etc. In one implementation, the seismic data may be recorded continuously over days or months at a time. In another implementation, the seismic data may be recorded intermittently, such as after each detonation of the seismic source 18.

The unmanned marine vessel 10 may include an onboard communication unit 34, which may communicate with a base station located onshore or at sea, such as on a rig or vessel. The communication unit 34 may be used to transmit data and information associated with the unmanned marine vessel 10, including position, quality control parameters, time information, and seismic data. The communication unit 34 may send or receive commands particular to the seismic survey. The unmanned marine vessel 10 may include a power source (batteries, motor, propeller, etc.) configured to drive and provide propulsion to the unmanned marine vessel 10. The unmanned marine vessel 10 may be powered by batteries, which may be recharged by solar panels disposed on the top of the unmanned marine vessel 10.

As mentioned previously and as illustrated in FIG. 1A, the streamer 14 may descend in a generally vertical direction from the unmanned marine vessel 10 into the water column. The length of the streamer 14 may vary from less than one meter to over one kilometer. A sub component 16 may be disposed between the umbilical cord or streamer 14 and the multi-dimensional seismic sensor array 12. The sub component 16 may provide for electrical communication between the unmanned marine vessel 10 and the multi-dimensional seismic sensor array 12. The sub component 16 may be employed as a fairing to reduce cross-flow noise due to currents and drag forces. Further, accelerometers capable of measuring a gravity direction (acceleration of gravity) may be used to measure a tilt of the streamer 14 relative to the vertical.

In reference to FIG. 1B, the system 101 may be referred to as an assembly or an ensemble of the unmanned marine vessel 10 including a wave glider float, the umbilical cord 14, the sub component 16, the force decoupling mechanism 17, and the multi-dimensional seismic sensor array 12. In some implementations, the force decoupling mechanism 17 may be used to couple the multi-dimensional seismic sensor array 12 to the unmanned marine vessel 10. As shown in FIG. 1B, the force decoupling mechanism 17 may be disposed between the sub component 16 and the multi-dimensional seismic sensor array 12.

In some implementations, the umbilical cord 14 may be thinner than for towed streamers and may provide for facilitating ease of handling by the unmanned marine vessel 10. The umbilical cord 14 may have a diameter of approximately 1 cm. Further, the umbilical cord 14 may be formed of fiber optic cables and/or cables with fiber optic sensors may be used, thus resulting in a lighter and thinner streamer relative to other towed streamers.

Figure 2:
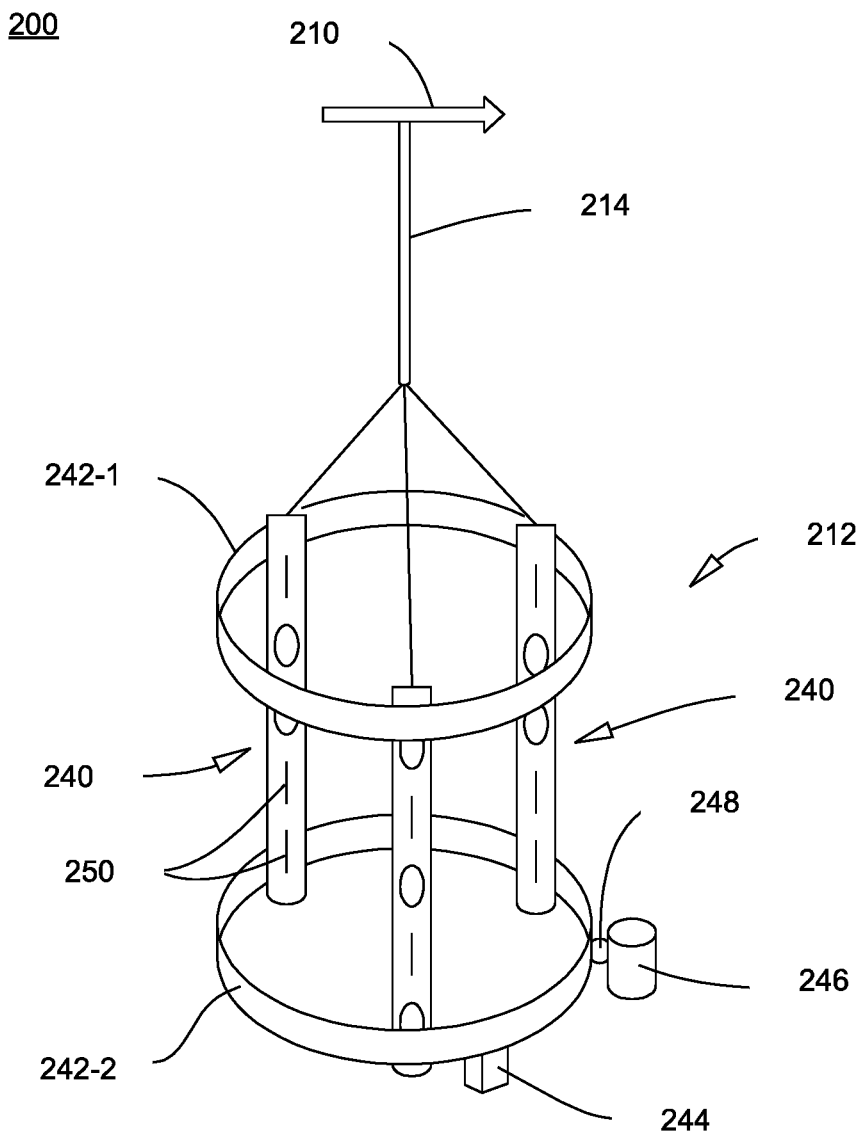
FIG. 2 illustrates a diagram of a system for acquiring seismic survey data using a multi-dimensional seismic sensor array coupled to an unmanned marine vessel.

FIG. 2 illustrates a diagram of a system 200 for acquiring seismic survey data using a multi-dimensional seismic sensor array 212 coupled to an unmanned marine vessel 210 in accordance with implementations of various techniques described herein. The multi-dimensional seismic sensor array 212 may be coupled to a hull of the unmanned marine vessel 210 (a wave glider float) via an umbilical cord 214, and the seismic sensor array 212 may acquire seismic survey data and calculate pressure gradients in multiple directions. Further, the multi-dimensional seismic sensor array 212 may float beneath the unmanned marine vessel 210 at a predetermined depth.

In reference to FIG. 2, the multi-dimensional seismic sensor array 212 may include multiple seismic streamers 240 (at least three seismic streamers) arranged parallel to one another in a triangular prism shape that can be positioned vertically. The seismic streamers 240 may be coupled together with multiple collars including a first collar 242-1 coupled to a first end of the seismic streamers and a second collar 242-2 coupled to a second end of the seismic streamers that is opposite the first end. Buoyancy of the multiple collars 242-1 and 242-2 may be sufficient to maintain the multi-dimensional seismic sensor array 212 at a particular depth in a water column. Further, the multi-dimensional seismic sensor array 212 may include one or more of an underwater orientation device 244, a small engine thruster 246, and a miniature steering device 248 (a mini Q-fin™).

The multi-dimensional seismic sensor array 212 may include a plurality of seismic sensors 250 arranged in a multi-dimensional geometric configuration. The seismic sensors 250 deployed in the streamers 240 may include one or more of hydrophones, MEMS accelerometers, geophones, and the like. The number of seismic sensors 250 and a separation of the seismic sensors coupled to the streamers 240 may be determined as a function of signal-to-noise (SNR) requirements and the capability to perform separation of an upgoing seismicwavefield from a downgoing seismic wavefiled (receiver deghosting).

In some implementations, if multiple hydrophone components refer to $u_i$, $v_i$, $z_i$, which may correspond to first, second, and third streamers, respectively, the pressure gradient may be calculated in a vertical direction. Consider the following nomenclature:

$$u_i - u_{i+1}$$

$$v_i - v_{i+1}  i=1,n \text{ where } n=\text{number of sensors in each cable}$$

$$z_i - z_{i+1}$$

Similarly, the gradients may be calculated in three horizontal directions:

$$u_i - v_i$$

$$v_i - z_i  i=1,n \text{ where } n=\text{number of sensors in each cable}$$

$$z_i - u_i$$

In some implementations, MEMS accelerometers may be used to measure water particle acceleration and gravity, where various gravity measurements may be used to determine sensor orientation. Further, since the pressure gradient may be derived from acceleration, a dual pressure gradient may be available to perform separation of upgoing and downgoing seismic fields.

Hydrophone measurements and MEMS acceleration measurements may be used to perform 2D deghosting and simultaneously 3D deghosting along with wavefield reconstruction, if the spatial separation of the arrays is adequate. A three dimensional sensor array may offer a possibility to attenuate seismic noise efficiently by applying a sequence of noise attenuation followed by 3D digital group forming. The output from a 3D dimensional seismic sensor array after digital group forming and 3D wavefield separation may include upgoing pressure at a location of the seismic sensor array determined at a time when the seismic source was actuated.

In some implementations, the multi-dimensional seismic sensor array 212 may include at least three vertical streamers 240 having a length of approximately 1 m to approximately 4 m and separated by approximately 0.5 m. The streamers 240 may be coupled together to form a triangular prism with use of two collars 242-1 and 242-2 (or rings). A composition of the collars may include a material having a density of less than (or substantially less than) approximately 1 g/cm$^3$ for floating in water. The number of collars may be more than two depending on the weight of the three vertical streamers and other devices that may be added, like the underwater orientation device 244 and the one or more thrusters 246. A calculation of buoyancy may be determined in such a way that the multi-dimensional sensor array 212 maintains a desired deployment depth in water.

In some implementations, the deployment depth of the multi-dimensional seismic sensor array 212 may be below 10 m from the water surface, such as a deployment depth of 15 m to 20 m or greater. Further, attached to the multi-dimensional seismic sensor array 212 may be the underwater orientation device 244, one or more small engines or thrusters 246, and/or one or more streamer steering devices 248 (mini Q-fins™ available commercially from WesternGeco, LLC) to assist with controlling the verticality of the multi-dimensional seismic sensor array 212 and to hold the multi-dimensional seismic sensor array 212 at the desired station, if the unmanned marine vessel 210 is configured to hold station. The thrusters 246 may assist with moving the multi-dimensional seismic sensor array 212 to a new station. An alternative to using the thruster 246 is using the steering devices 248, where the steering devices 248 may be used to steer the streamers 240 in towed-streamer marine data acquisition.

Figure 3:
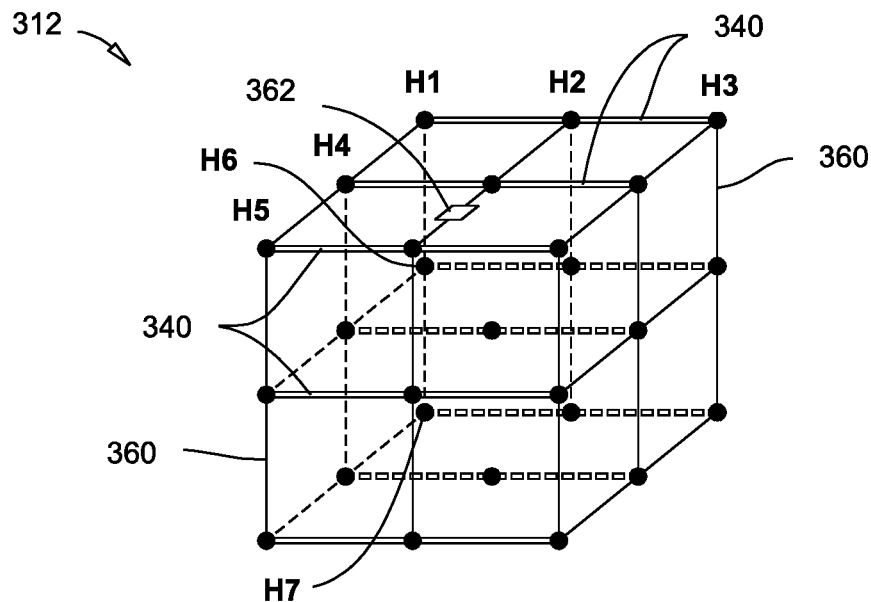
FIGS. 3 and 4 illustrate various diagrams of devices for acquiring seismic survey data using a multi-dimensional seismic sensor array coupled to an unmanned marine vessel.

FIG. 3 illustrates a diagram of a device 300 for acquiring seismic survey data using a multi-dimensional seismic sensor array 312 coupled to an unmanned marine vessel (see the unmanned marine vessel 10 of FIG. 1A) in accordance with implementations of various techniques. The multi-dimensional seismic sensor array 312 may be coupled with a hull of the unmanned marine vessel (a wave glider float) via an umbilical cord, and the seismic sensor array 312 may be configured to acquire seismic survey data and calculate pressure gradients in multiple directions. Further, the multi-dimensional seismic sensor array 312 may be configured to float beneath an unmanned marine vessel at a pre-determined deployment depth in a water column.

In one implementation, the multi-dimensional seismic sensor array 312 may include multiple seismic streamers 340 (optionally at least nine seismic streamers) arranged in a multi-dimensional geometric structure such as a cuboid type lattice structure having three planar levels of three seismic streamers spaced apart at similar spatial intervals. In such an embodiment, 3 seismic streamers×3 rows of seismic streamers=9 seismic streamers. In some implementations, the multi-dimensional seismic sensor array 312 may include a frame 360 with multiple seismic streamers 340 (optionally at least nine seismic streamers) arranged in a multi-dimensional geometric structure (optionally a cuboid) at pre-determined spatial intervals. As shown, the seismic streamers 340 may be spaced apart at pre-determined spatial intervals, which may be similar, different, or random spatial intervals. Streamers may deviate from a straight configuration, and can have certain curved characteristics or portions. According to some embodiments, fewer than nine seismic streamers can be connected to form a cube or rectangular shaped array. Four seismic streamers can be connected to form a cube or rectangular shaped array.

In some implementations, the multi-dimensional seismic sensor array 312 may be arranged in a multi-dimensional geometric structure, which may define a cuboid type lattice structure having four open side faces and two open end faces. The cuboid type lattice structure may include at least one seismic streamer coupled at each lateral edge where the four open side faces intersect, thus forming the four seismic streamers. The cuboid type lattice structure may further include at least one seismic streamer positioned between each lateral edge of the four open side faces, thus forming an additional four seismic streamers. The cuboid type lattice structure may further include at least one seismic streamer positioned within the cuboid type lattice structure, such as in a central region of the cuboid structure, thus forming one additional seismic streamers. In that embodiment, 4 seismic streamers+4 seismic streamers+1 seismic streamer=9 seismic streamers.

In some implementations, the multi-dimensional seismic sensor array 312 may include three seismic streamers arranged in parallel to one another defining a first plane and two seismic streamers arranged in parallel to at least one of the first three seismic streamers and defining a second plane that is substantially perpendicular to the first plane.

In some implementations, the multi-dimensional seismic sensor array 312 may include a plurality of hydrophones H1, H2, . . . , H7 arranged in x-coordinate, y-coordinate, and z-coordinate directions, as shown in FIG. 3. Each seismic streamer may include at least three hydrophones. As such, the multi-dimensional seismic sensor array 312 may include a 3D hydrophone array that can be attached to an unmanned marine vessel (a wave glider).

In some implementations, the multi-dimensional seismic sensor array 312 may include the 3D hydrophone array that may include 9 short streamers. The dimension of seismic sensor array 312 may be (or substantially be) 1.2 m×1.2 m×1.2 m. These dimensions can be smaller however and still function properly. The multi-dimensional seismic sensor array 312 may include a horizontal streamer separation of (or substantially) 0.6 m and a vertical separation of (or substantially) 0.6 m. The multi-dimensional seismic sensor array 312 may include three hydrophones per streamer and an interval between the hydrophones may be (or substantially be) 0.6 m. According to some embodiments, the multi-dimensional seismic sensor array 312 may allow for calculating the first and second derivatives of pressure in any or all of x, y, and z directions and detecting the direction of the seismic arrival.

Using various implementations, the pressure gradient and the second derivative of pressure in x, y, and/or z directions may be calculated. Various implementations may further allow for performing 3D deghosting and also interpolation of the pressure in x and y directions. Further, the multi-dimensional seismic sensor array 312 may allow for detecting direction of the seismic arrival.

A streamer in the multi-dimensional seismic sensor array 312 may be equipped with hydrophones and MEMS accelerometers. From accelerometer measurements, the pressure gradient may be estimated in any or all of x, y, and z directions, and based on these gradient measurements and pressure measurements (hydrophone data), 3D receiver deghosting and interpolation may be performed. Pressure gradient sensors can also be used.

In some implementations, the multi-dimensional seismic sensor array 312 may include a transponder 362. Further, the multi-dimensional seismic sensor array 312 may be equipped with the transponder 362 to allow for accurate positioning. As such, the transponder 362 may be used with a positioning system, such as an Ultra Short Base Line (USBL) positioning system. The USBL may be referred to as a Super Short Baseline (SSBL), and generally, the USBL may be used as an underwater positioning system along with a vessel mounted transceiver to detect range and bearing of a target using acoustic signals.

Figure 4:
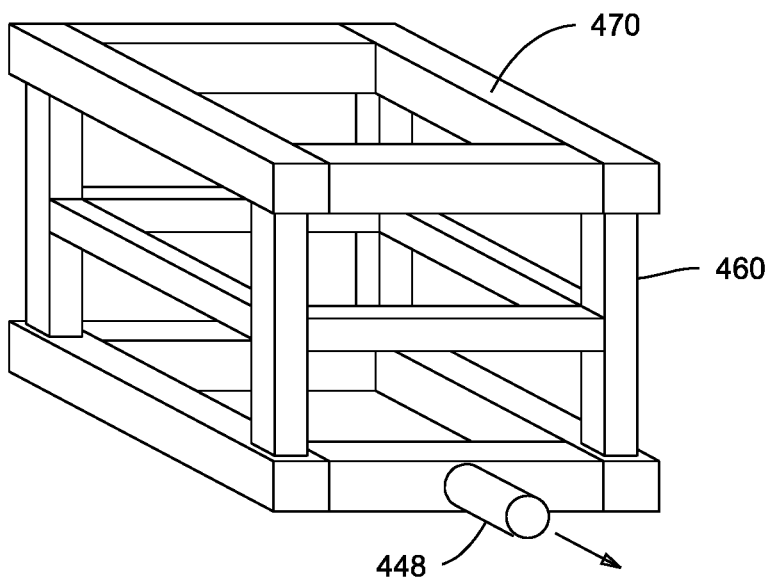

FIG. 4 illustrates a diagram of a device 400 for acquiring seismic survey data using a multi-dimensional seismic sensor array 412 coupled to an unmanned marine vessel (see the unmanned marine vessel 10 of FIG. 1A). The multi-dimensional seismic sensor array 412 may be coupled to a hull of the unmanned marine vessel (a wave glider float) via an umbilical cord, and the seismic sensor array 412 may acquire seismic survey data and calculate pressure gradients in multiple directions. Further, the multi-dimensional seismic sensor array 412 may provide for floating beneath an unmanned marine vessel at a pre-determined deployment depth in a water column.

In reference to FIG. 4, the multi-dimensional seismic sensor array 412 may include a plurality of shallow water nodes 470 and a frame 460 having members that are arranged to define a multi-dimensional geometric structure, such as, a multi-dimensional cuboid type lattice structure. The frame 460 may be operatively coupled the shallow water nodes 470 together in the multi-dimensional geometric structure, shape, or form. The multi-dimensional seismic sensor array 412 may include a steering device 448, or thrusters as described above with reference to FIGS. 2 and 3.

The multi-dimensional seismic sensor array 412 may include eight shallow water nodes 470. As shown in FIG. 4, a first grouping of four shallow water nodes 470 may be coupled together and positioned at a first end of the multi-dimensional seismic sensor array 412, and a second grouping of four shallow water nodes 470 may be coupled together and positioned at a second end of the multi-dimensional seismic sensor array 412. The first end is opposite the second end.

The multi-dimensional geometric structure 412 may be configured to define an expanded cuboid type lattice structure with three planar levels of members spaced apart at similar pre-determined spatial intervals. As shown, the first grouping of four shallow water nodes 470 may be coupled together to define a rectangular shape, and similarly, the second grouping of four shallow water nodes 470 may be coupled together to define another rectangular shape.

Further, in some implementations, the multi-dimensional geometric structure may be described as a cuboid type lattice structure having four open side faces and two open end faces, including a first open end face and a second open end face. The cuboid type lattice structure may include four shallow water nodes coupled in a rectangular shape at each lateral edge of the first open end face. The cuboid type lattice structure may further include another four shallow water nodes coupled in a rectangular shape at each lateral edge of the second open end face.

As described in reference to FIG. 4, the multi-dimensional seismic sensor array 412 may be constructed and/or manufactured using shallow water nodes 470. In some implementations, each shallow water node 470 may include a hydrophone, three component geophones, and a recording system configured to record continuously for a certain period of time (1 month or less or more). In some implementations, each of the shallow water nodes 470 may include one or more geophones arranged in a vertical orientation and configured to calculate a second derivative of pressure. Further, a compass device and an inclinometer or MEMS accelerometer may be included with the node and used to determine orientation of the node in a water column. Further, the frame 460 may be constructed and/or manufactured to hold together eight shallow water nodes, as shown in FIG. 4. Further, the multi-dimensional sensor array 412 may be coupled or attached to an unmanned marine vessel using a vertical decoupling mechanism (see the vertical force decoupling mechanism 17 of FIG. 1B).

In some embodiments, the dimensions of each node may be (or substantially be): length=521 mm, width=208 mm, and height=108 mm. In some embodiments, the dimensions of the multi-dimensional seismic sensor array 412 may be (or substantially be): 521 mm×521 mm×521 mm.

In operation, the multi-dimensional seismic sensor array 412 may include eight shallow water nodes that may allow for calculating pressure gradients in vertical and horizontal directions. Also, having vertical geophones inside each shallow water node may allow for calculating the second derivative of the pressure.

Figure 5:
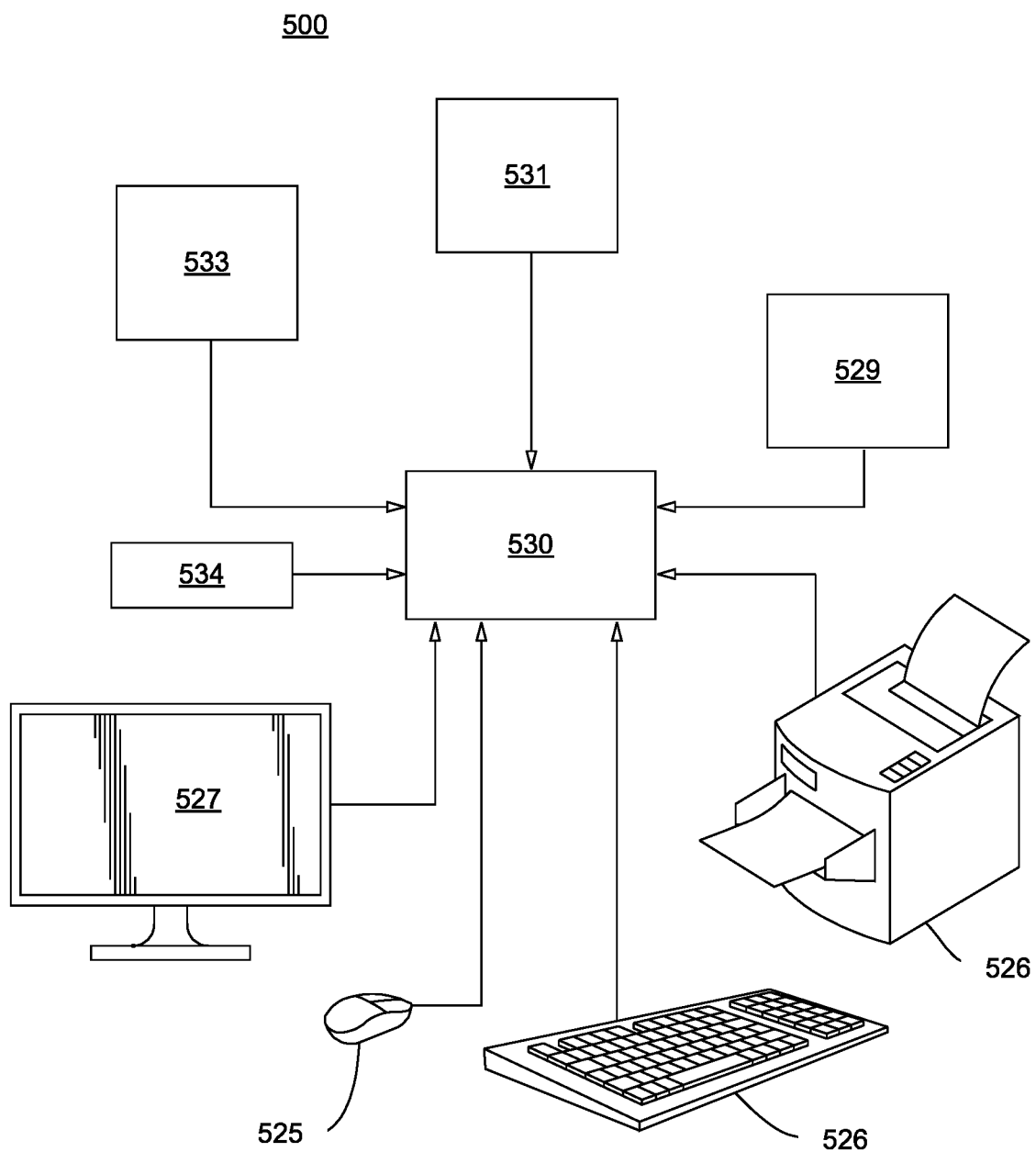
FIG. 5 illustrates a diagram of a computing system for storing, processing, and displaying seismic survey data acquired by a multi-dimensional seismic sensor array coupled to an unmanned marine vessel.

FIG. 5 illustrates a computing system 500 that may be used in connection with various implementations described herein that may be implemented. The computing system 500 (system computer) may include one or more system computers 530, which may be implemented as any conventional computer or server. Various techniques may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 530 may be in communication with solid-state and/or hard disk storage devices 529, 531, and 533 optionally by way of a local area network or by remote access. One or more storage devices may be used to store program instructions, measurement data, and results as desired. The system computer 530 may be operatively coupled to one or more networks, one or more busses, etc. to receive vessel data 534, which can include sensor data, which may be raw data and/or processed data.

In some implementations, seismic data from sensors may be stored in the storage device 531. The system computer 530 may retrieve the appropriate data from the storage device 531 to process seismic data according to program instructions that correspond to implementations of various techniques. The program instructions may be written in a computer programming language, such as C++, Java and the like. The program instructions may be stored in a computer-readable storage medium, such as a program storage device 533. Such computer-readable storage media may include computer storage media and communication media. Computer storage media may include volatile and non-volatile, and removable and non-removable media, etc. Information that may be stored can include computer-readable instructions, processor-executable instructions, data structures, program code and one or more types of other data. Computer storage media may include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or one or more other medium which can be used to store the desired information and which can be accessed by the system computer 530. Communication media may embody computer readable instructions, data structures or other program code. Communication media may include wired media such as a wired network or direct-wired connection, and wireless media such as acoustic, radio frequency (RF), infrared (IR), and various other wireless media. Further, combinations of one or more of the above may also be included within the scope of computer readable media. A computer-readable storage medium is non-transitory, not a carrier wave and not a signal.

In some implementations, the system computer 530 may provide output primarily onto graphics display 527, or alternatively via printer 528. The system computer 530 may store the results of the methods described above on storage device 529, for later use and further analysis. Further, the keyboard 526 and/or the pointing device 525 (consider a mouse, trackball, or the like) may be provided with the system computer 530 to enable interactive operation. The display 527 may be a touchscreen display for touch input, which may include gestures.

The system computer 530 may be located at a data center remote from the survey region. The system computer 530 may be in communication with the receivers (either directly or via a recording unit, not shown), to receive signals indicative of the reflected seismic energy. These signals, after formatting and other initial processing, may be stored by the system computer 530 as digital data in the storage device 531 for subsequent retrieval and processing. In one implementation, these signals and data may be sent to the system computer 530 directly from sensors, such as geophones, hydrophones, and the like. When receiving data directly from the sensors, the system computer 530 may be described as part of an in-field data processing system. In another implementation, the system computer 530 may process seismic data already stored in the storage 831 device. When processing data stored in the storage device 531, the system computer 530 may be described as part of a remote data processing center, separate from data acquisition. The system computer 530 may process data as part of the in-field data processing system, the remote data processing system or a combination thereof.

A marine seismic acquisition system can include 3D sensor arrays towed by wave gliders. Buoyancy may be designed into one or more portions of a system to control orientation. One or more pieces of equipment may be shaped, weighted, distributed as to weight, include one or more chambers (gas and/or liquid, etc.) that can provide one or more pieces of equipment with desired buoyancy characteristics. Buoyancy may be fixed and/or adjustable. Adjustable buoyancy may be achieved via passive and/or active mechanisms (consider one or more of openings, pumps, chambers, valves, vents, etc.). A piece of equipment can include a weighted area that can cause a certain rotation that may be effectively maintained while the piece of equipment is deployed. A buoyancy "generator" may be above a weighted area and held at a certain rotation (orientation with respect to a reference frame). Equipment can include a sensor array that includes a buoyancy engine and one or more orientation sensors.

A buoyancy engine can include one or more sensors that measure roll, pitch, yaw and depth. A buoyancy engine can include a compass-gyro (gyrocompass) that can sense at least pitch, roll and heading. Marine seismic acquisition can be implemented via vessels that can tow large streamer spreads, for instance 12 to 18 streamers, 8 km in length, with 100 m crossline separation. Alternatively or additionally, marine seismic acquisition can be implemented via one or more wave glider-autonomous marine vehicles, which may be powered by one or more of waves, solar energy, etc. A glider can tow a relatively small 3D, multi-measurement sensor array (3DSA). A small 3DSA may be less than approximately 3 m by 3 m by 3 m. Data acquired via such an array are illustrated as plots or images in various figures herein.

Towing a streamer that has a length dimension of about 30 meters can present some challenges due to factors such as high drag, reduced maneuverability, inaccurate positioning of the receivers along the streamers and contamination with one or more types of streamer noise, like swell noise, current noise, and the noise induced by the movement of the streamers. One or more of such issues may be alleviated at least in part via use of a different type of sensor arrangement (a 3D sensor array that can replace a streamer, etc.).

Figure 6:
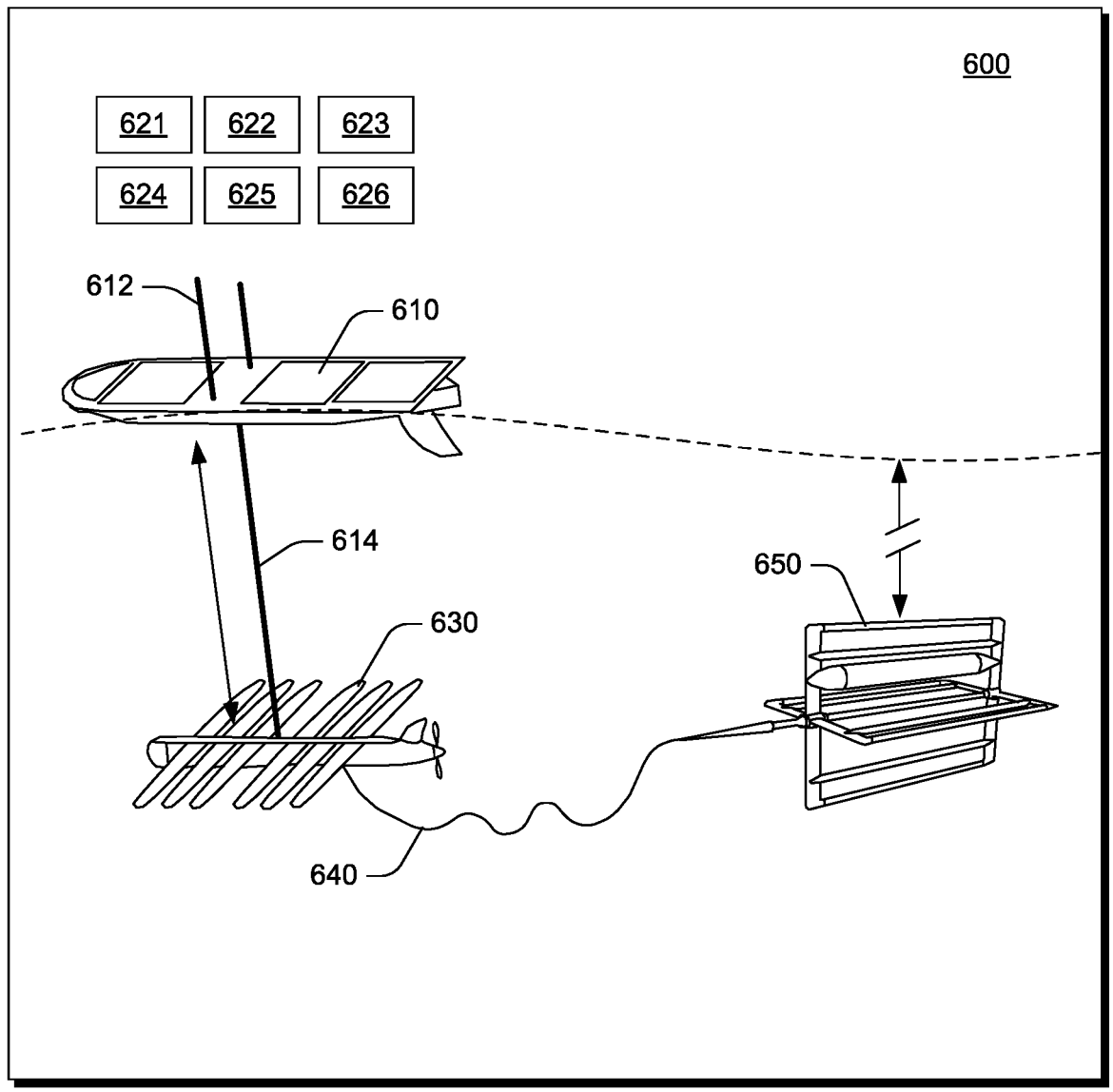
FIG. 6 illustrates a diagram of a system that includes a wave glider float, a wave glider sub, and a 3D sensor array for acquiring seismic survey data.

FIG. 6 shows a system 600 that includes a wave glider float 610, a wave glider sub 630 (submarine) and a 3D sensor array 650 that is operatively coupled to the wave glider sub 630 via a decoupling cable 640 (a tow cable) that operatively couples the 3D sensor array 650 to the wave glider sub 630. Decoupling can refer to motion decoupling such that the 3D sensor array 650 can be steadied (consider the cable 640 being a motion isolating or motion isolation cable). As shown, the wave glider 630 is operatively coupled to the vessel 610 via an umbilical 614 (umbilical cable) that can include a cable for communication of data and/or power. The wave glider float 610 can include solar panels 621, a battery or batteries 622, GPS and IRIDIUM® communication interfaces 623 and 624 as well as vehicle management equipment 625 and computerized acquisition equipment 626 for acquiring seismic data. The wave glider sub 630 can include wings and a rudder as well as other features for propulsion and heading assistance.

The 3D sensor array 650 can include hydrophone sensors or can include hydrophone sensors and pressure gradients sensors. A hydrophone sensor array can include approximately 6 or more hydrophones (hydrophone sensors). A hydrophone sensor array may include 15 hydrophones placed in and/or on 5 arms (members), with 3 hydrophones per arm, separated by approximately 50 cm in x, y and z directions of a Cartesian coordinate system such that a length of an arm may be at least 150 cm.

Figure 7:
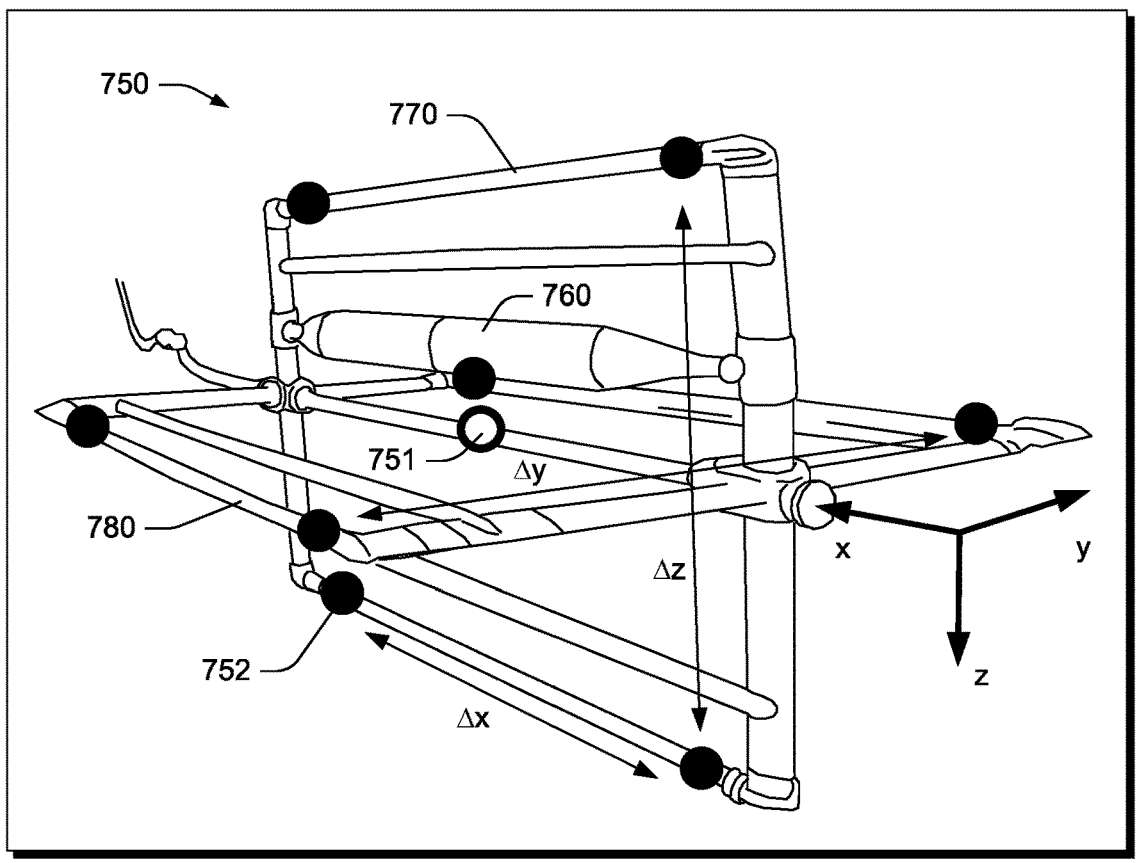
FIG. 7 illustrates a diagram of a 3D sensor array that may be used as the 3D sensor array of FIG. 6.
Figure 7:
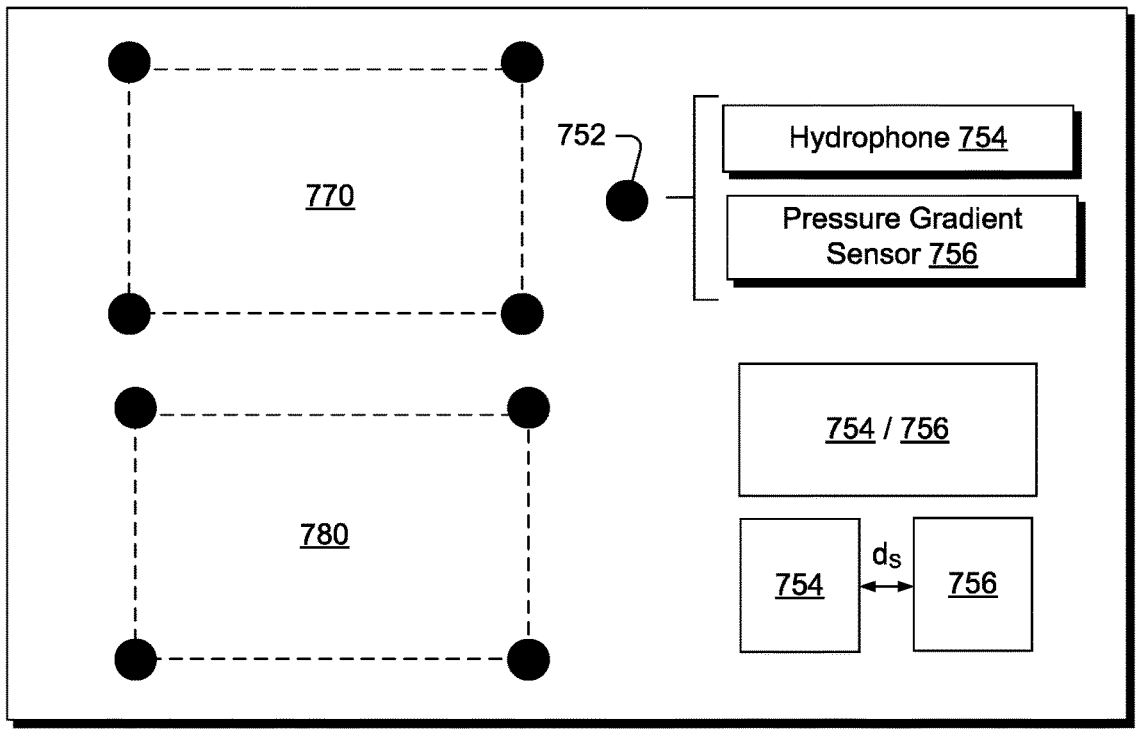

FIG. 7 shows a 3D sensor array 750 that includes structural elements that form a first substantially planar frame 770 and structural elements that form a second substantially planar frame 780. As shown, the frames 770 and 780 are substantially orthogonal to each other about a central structural rod (arm or member) that includes an underwater beacon 751 mounted thereto. While a relatively rectangular structure is illustrated, a 3D sensor array may be arranged using a cylindrical, an ellipsoidal, a conical, or another shape of structure. Planes and orthogonality may be determined by locations of sensors.

FIG. 7 shows the 3D sensor array 750, which may be used as the 3D sensor array 650 of FIG. 6, as including a buoyancy engine 760 that can be used to adjust the depth of the 3D sensor array 750. The buoyancy engine 760 can include various components that can be operated to control the buoyancy of the 3D sensor array 750. The buoyancy engine 760 can include one or more chambers that can hold fluid, whether gas and/or liquid. A chamber may be a ballast chamber (ballast tank). A buoyancy engine 760 may include stored compressed fluid (a compressible gas) and/or include one or more compressors that can compress gas. A compressor may be a pump. A buoyancy engine can include a pump or pumps, which may be for pumping compressible fluid and/or incompressible fluid (water, etc.). A pump may be operated to change buoyancy by changing an amount of ballast in a chamber or chambers. One or more valves may be operable to change buoyancy. One or more vents may be operable to change buoyancy via movement of fluid(s) (gas and/or liquid) into and/or out of a chamber. A change in buoyancy can be positive (to rise) or negative (to dive). A buoyancy state can be neutral (neutral buoyancy). A buoyancy engine can include a primary chamber for descent or ascent and a trim chamber that may be utilized to adjust attitude (on surface and/or underwater). A buoyancy engine can be operable for positioning a 3DSA on a bottom of a body of water. Consider a body of water that is approximately 2 meters to approximately 5 meters in depth. A buoyancy engine can allow the 3DSA to descend to and remain with its bottommost side at the level of the bottom (seabed, etc.).

The buoyancy engine 760 can include a tubular housing where a region or regions are sealed to avoid intrusion of water. The buoyancy engine 760 can house one or more orientation sensors such as a 3-axis gyroscope, one or more 3-axis accelerometers, a 3-axis magnetometer, and a depth sensor; one or more of which may be in a sealed region. The buoyancy engine may include a gyrocompass (or compass-gyro). A depth sensor or depth gauge may be a pressure sensor or pressure sensors. Orientation information may be transmitted via a data interface to a recording system (local and/or remote) according to a time interval (second or more or less).

The 3D sensor array 750 can use the underwater beacon 751 to determine the distance from the 3D sensor array 750 to a glider float, a glider sub, etc. Such a beacon may operate via one or more types of signals that can be transmitted in water. As mentioned, various components (sensors, etc.) can be inside a housing that is a sealed housing such that water does not contact the components. Such a housing can be a buoyancy engine housing, which may also include one or more fluid chambers for control of buoyancy.

As shown in FIG. 7, the 3D sensor array 750 (3DSA) can include locations 752 with collocated hydrophones 754 and pressure gradients sensors 756. In FIG. 7, the 3D sensor array 750 can include 8 hydrophones 754 and 8 three dimensional pressure gradient sensors 756 operatively coupled to the bi-planar frame, which may be of dimensions of approximately 1 m (x-direction) by approximately 1 m (y-direction) by approximately 1 m (z-direction). The separation of the sensors in x, y and z directions can be approximately 1 m as indicated by $\Delta x$, $\Delta y$ and $\Delta z$. A multi-dimensional pressure gradient sensor can be a two-dimension pressure gradient sensor or a three-dimensional pressure gradient sensor that can directly measure the pressure gradient in two or three directions such as two or three of the x, y and z directions. The particular 3D sensor array 750, in terms of number of sensors and the distance between sensors, can be more or less than shown in FIG. 7.

FIG. 7 shows a hydrophone 754 and a pressure gradient sensor 756 as being in a common housing (as a multi-sensor unit) and as being in two separate housings that can be separated by a distance ds, which may be in a range from contact (approximately 0 cm) to approximately 10 cm, and be considered sufficiently close such that the sensors 754 and 756 are collocated. A common data interface may of a multi-sensor unit or for separate sensors can transmit data from a hydrophone and from a pressure gradient sensor to a data interface, directly or via other circuitry, for transmission to a cable. Such a cable (or cables) can be operatively coupled to a sub that is operatively coupled to a float where the float includes circuitry that is operatively coupled to one or more data storage devices. A data storage device may be rated with a capacity such as terabytes and be capable of storing days of data (survey data, etc.) acquired by one or more 3DSAs that are operatively coupled to the float via the cable or cables (see the float 610, the umbilical 614, the sub 630 and the cable 640 of FIG. 6).

In FIG. 7, the 3DSA 750 includes a relatively rigid frame that includes a plurality of sensor arms (consider about three to about 10 arms) placed in a substantially vertical plane 770 and in a substantially horizontal plane 780. A 3DSA may include one or more curved arms (cylindrical, ellipsoidal, etc.).

In FIG. 7, hydrophone sensors may be in an array with 15 hydrophones spaced at approximately 50 cm in x, y and z directions (as in a Cartesian coordinate system that includes x, y and z axes). Such an array may be approximately 1.5 m by 1.5 m by 1.5 m.

In FIG. 7, each arm can include a number of hydrophones (consider 3 hydrophones spaced at about 50 cm) where a common distance can be between hydrophones, in the vertical and horizontal planes. In FIG. 7, the buoyancy engine 760 can include a tube as a housing placed in the vertical plane where the tube houses one or more inertial motion sensors to measure array orientation. Yaw, roll and pitch may be measured at intervals of the order of a second (or more or less) and transmitted to an acquisition system located in a wave glider float. As shown in FIG. 6, seismic measurements from the hydrophones 754 and/or the pressure gradient sensors 756 can be transmitted, via the decoupling cable 640 and the umbilical 614 to the acquisition system 626 and stored on in one or more storage devices of the wave glider 610. Where desired, seismic data may be continuously recorded (stored to one or more storage devices).

Positioning of the 3D sensor array 750 can be based on the GPS receiver positioning of the wave glider float 610 and on the orientation and depth measurements. Real time quality control (QC) of seismic data recorded by each hydrophone 754 in the 3D sensor array 750 can be performed by estimating a series of statistical attributes that can be sent (via satellite or other communication link) to one or more QC geophysicists, etc. (at 5 minutes intervals, etc.).

Seismic data acquired with the 3D sensor array 750 or arrays versus ocean bottom cable (OBC) sensor data can be compared to evaluate how well a wave glider can hold station, maintain desired depth, and move from one place to another, as field operations occur.

Figure 8:
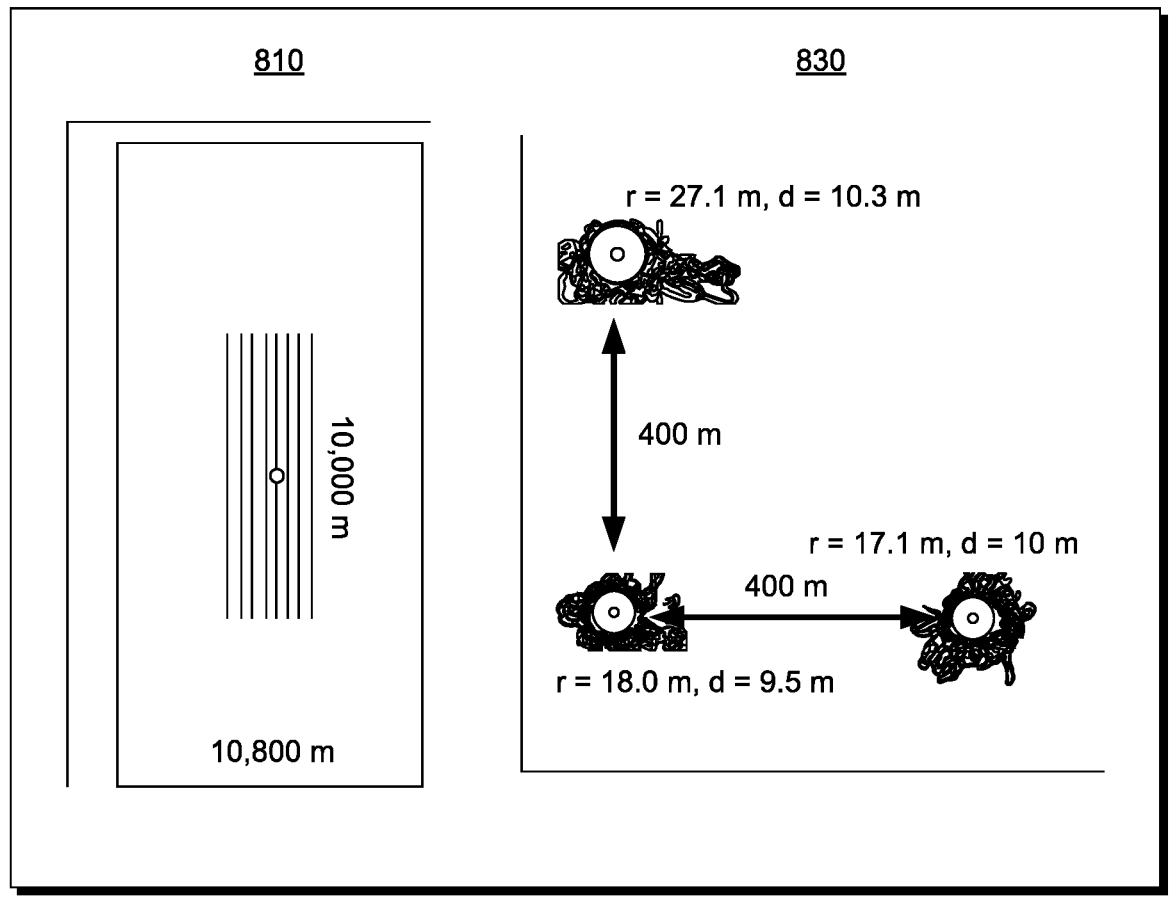
FIG. 8 illustrates plots pertaining to an ocean bottom cable (OBC) survey.

FIG. 8 shows information in plots 810 and 830 pertaining to an OBC survey conducted in an area with a hard water bottom and water depths from 20 m to 25 m. As shown in the plot 810, the OBC survey included a two-dimensional (two axis) orthogonal acquisition geometry with 8 receiver lines, 10,000 m receiver line length, 400 m interval between receiver lines, 10,800 m source line length and 100 m source line interval. In the survey, two source vessels were used, each one with a dual source array, 50 m crossline separation. The shot interval was 25 m (flip-flop).

Three wave gliders, equipped with 3D sensor arrays, were deployed inside the source patch, on top of the OBC receivers. Separation of the 3D sensor arrays was 400 m in both directions as indicated in the plot 830. Data were acquired during the shooting of two source patches, for 6 days. The wave gliders were programmed to hold station by moving around a small circle around the station location. Paths are represented in the plot 830 that correspond to the locations of the wave gliders during 7 acquisition days. The average radius circles around each pre-plot receiver station, for each wave glider, are shown as a larger radius circle with a center circle. As indicated, r is radius and d is depth where data indicated radii of 27.1 m, 18.0 m and 17.1 m and depths for the 3DSAs of approximately 10 m.

Evaluation of the data quality was performed by comparing common receiver gathers from OBC and 3D sensor arrays recorded at the same locations, and limited offset 3D stacks. The comparison for OBC is for the hydrophone data.

Each shot recorded in the 3D sensor array included 15 traces, corresponding to 15 hydrophones. Processing may be performed in common receiver gathers, similar to OBN processing. A common receiver gather (CRG) can be generated for each hydrophone and contains the shots from a single source line.

Figure 9:
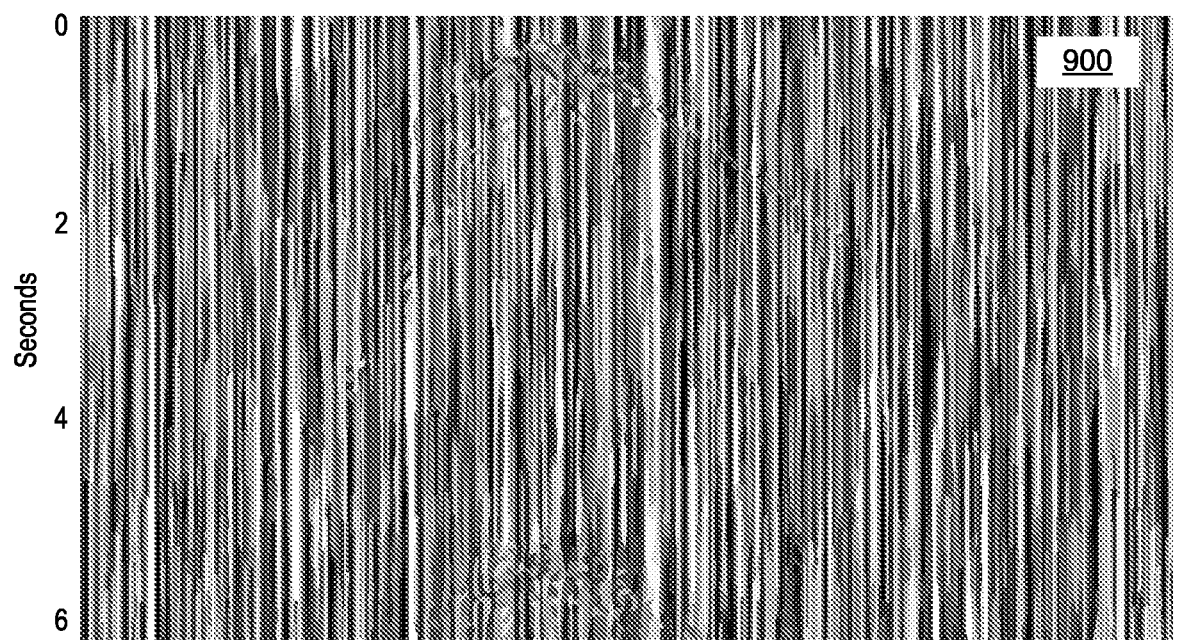
FIG. 9 illustrates a plot of unprocessed 3D sensor array data from a common receiver gather (CRG)

FIG. 9 shows a plot 900 for 3D sensor array unprocessed data from a CRG corresponding to one hydrophone and one shot line. The swell noise tends to dominate the record as the 3D sensor array is deployed at 10 m depth. Again, FIG. 9 shows raw (unprocessed) CRG gather for one hydrophone of the 3DSA and one source line.

Figure 10:
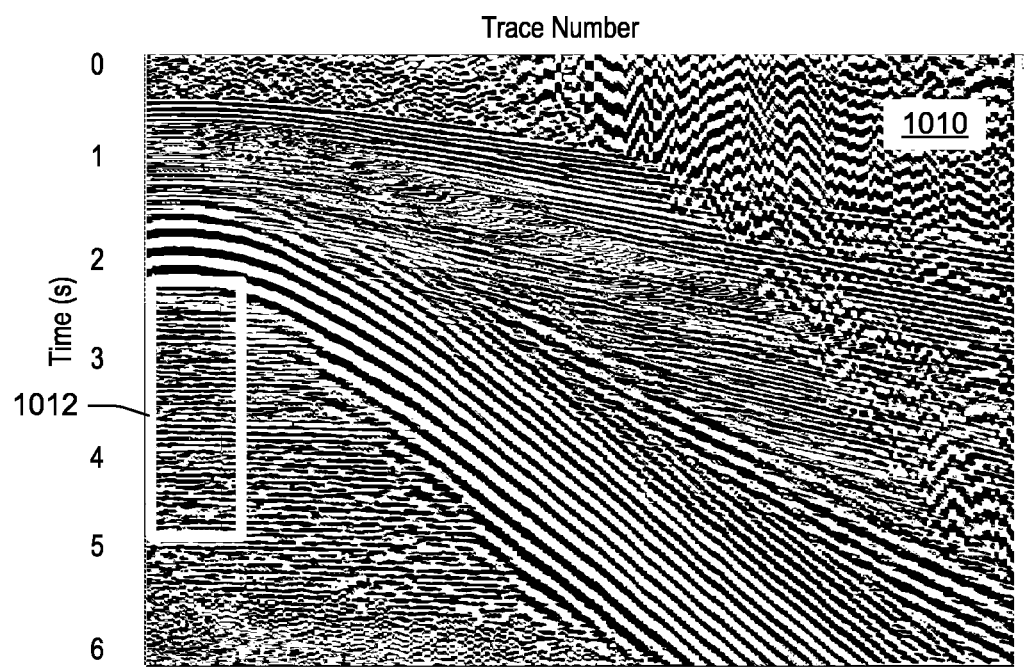
FIG. 10 illustrates plots of data for a comparison between an OBC CRG with a 3D sensor array (3DSA) CRG.
Figure 10:
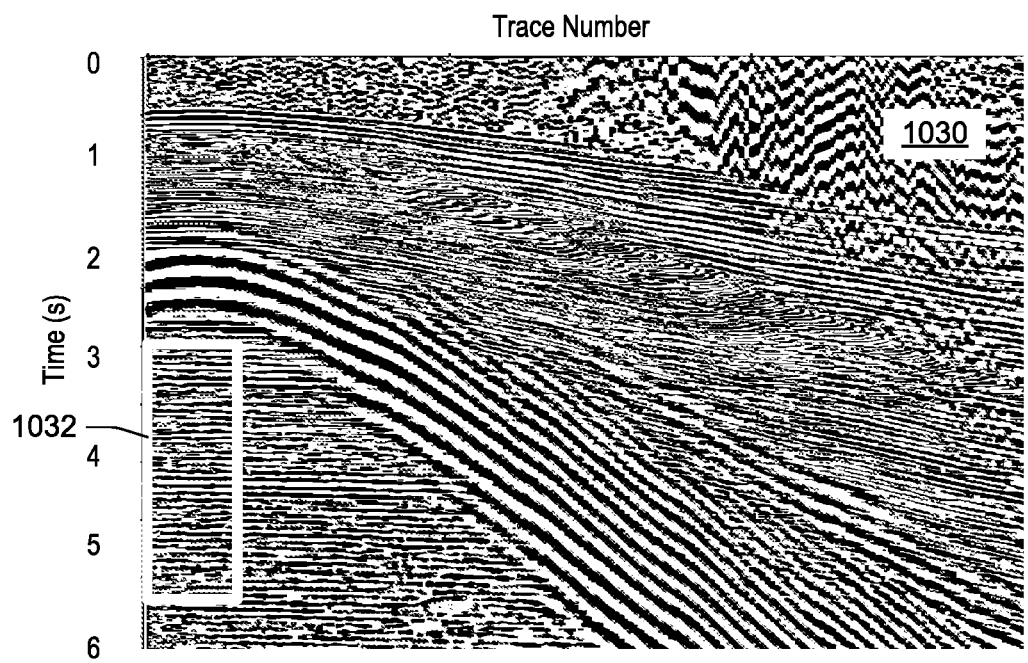

In FIG. 10 shows plots 1010 and 1030 of data for a comparison between a OBC CRG with a 2H low cut filter applied in the acquisition system and 3D sensor array CRG, after swell noise was removed. A singular value decomposition (SVD) type algorithm was used to evaluate the swell noise and subtract it from the data. Scholte wave energy is quite strong on the OBC CRG because it propagates along water bottom interface. An evanescent Scholte wave propagates through the water layer with exponentially decaying amplitude and it is recorded by the hydrophones of the 3D sensor array with weaker amplitudes. Direct arrivals, refracted waves and seismic interferences from the far source are visible on both CRG gathers. Again, FIG. 10 shows a comparison of OBC CRG 1010 versus 3DSA CRG 1030 after swell noise was removed from 3DSA data.

Figure 11:
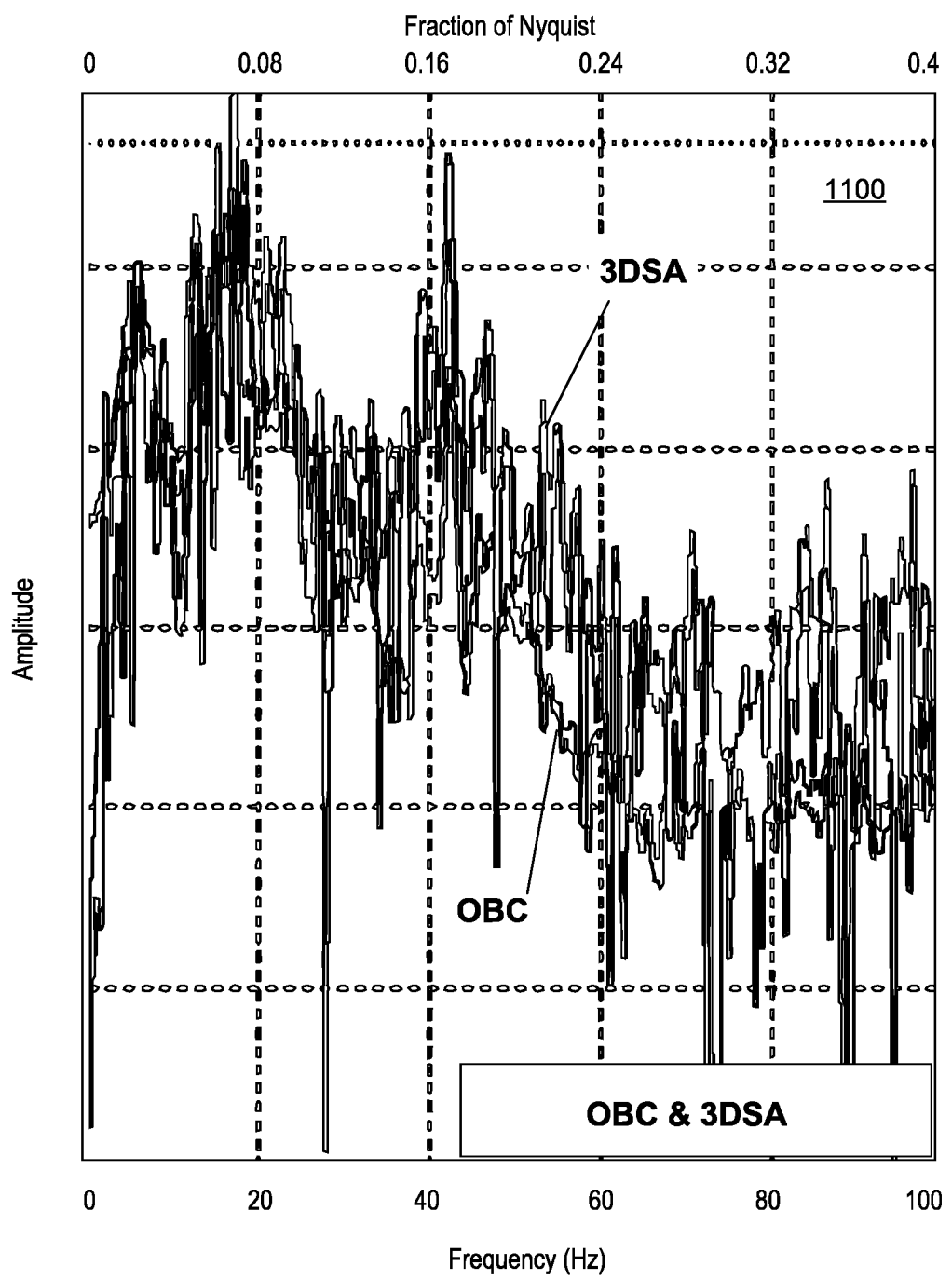
FIG. 11 illustrates a plot of amplitude spectra of the OBC CRG and the 3DSA CRG of FIG. 10.

Frequency content of both datasets was analyzed and an amplitude spectrum is presented in FIG. 11 as a plot 1100; noting that these amplitude spectra are labeled OBC and 3DSA where the 3DSA tends to be the upper data and OBS the lower data.

The amplitude spectrum was estimated in the window marked by the rectangles 1012 and 1032 with white lines in the plots 1010 and 1030 of FIG. 10. The frequency content is slightly higher than for OBC, except at the very low frequencies, around 5 Hz. This amplitude increase is expected because the OBC data are recorded on the water bottom and the lower frequencies are better preserved at a larger depth.

Figure 12:
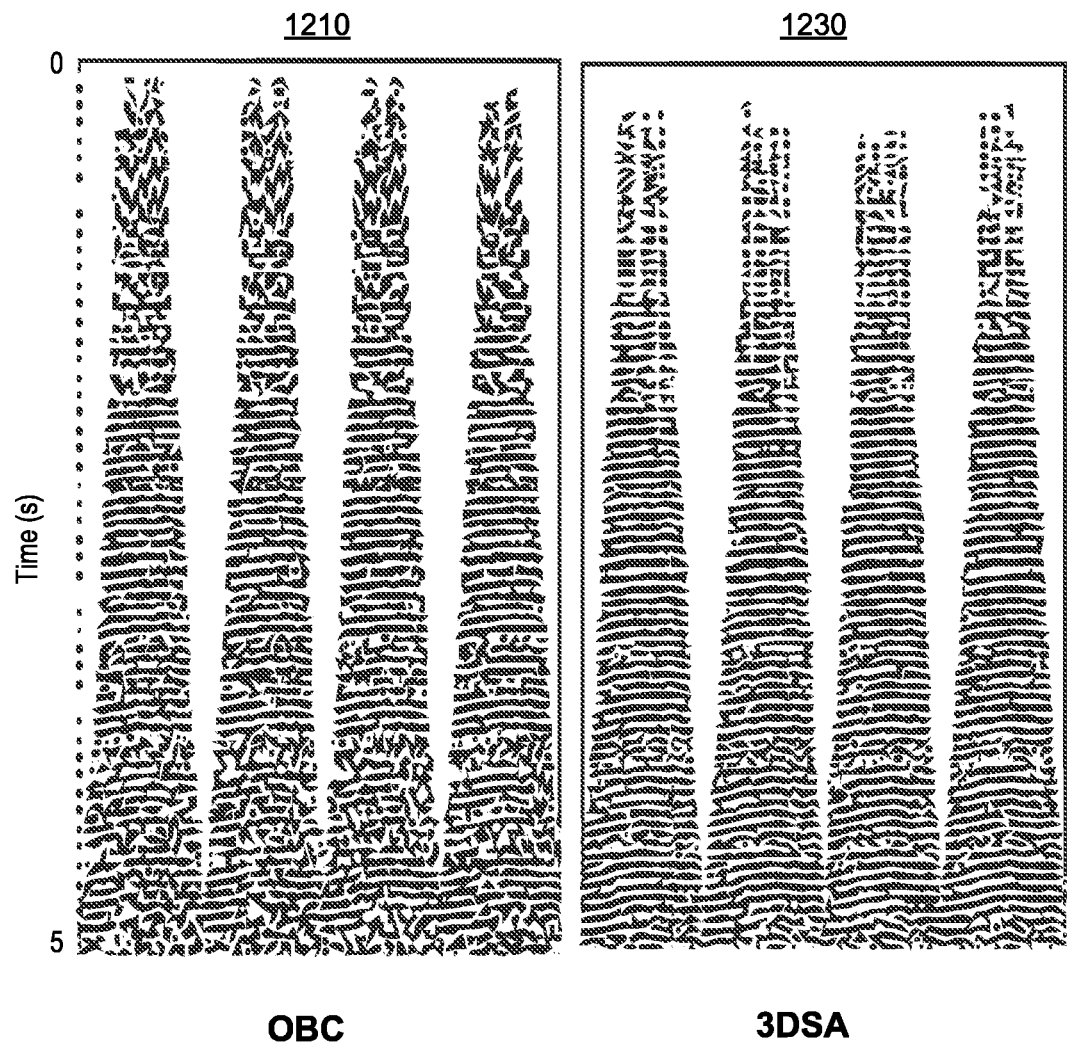
FIG. 12 illustrates plots of limited offset 3D stacks generated for the OBC CRG and the 3DSA CRG of FIG. 10.

Limited offset 3D stacks were generated for OBC and 3DSA data and the results for 4 in-lines are shown in FIG. 12 as plots 1210 and 1230. Processing applied was 2H low cut filter on OBC data and swell noise attenuation on 3DSA data. Signal to noise is improved on 3DSA due to the summing of the 15 hydrophones (a benefit of the 3D sensor multi-measurement array acquisition).

Results of the field test with 3D sensor arrays towed by wave gliders demonstrates that data quality recorded with 3D sensor array is comparable or better, in terms of signal-to-noise and frequency content, with OBC data. From an operational point of view it was demonstrated that the wave gliders can be remotely controlled to hold station (see the plot 830), move along a pre-defined path and maintain a pre-defined depth. The maneuverability of the wave glider equipped with a 3D sensor array proved to be easier than towing a short streamer, particularly in a congested field.

As to processing aspects of 3D sensor array data towed by wave gliders, processing of data recorded with 3D sensor array may be performed in CRG, as may be performed for node surveys. A processing sequence may include: harvesting the shot data from continuous data; merging the shot positions into 3DSA data; positioning QC based on pressure gradient estimations; sorting the data in common receiver gathers (CRGs); swell noise attenuating; source signature shaping; sorting the data in shot domain; receiver deghosting based on pressure gradients; summing of the hydrophones (6 or more) to improve the signal to noise; data sorting to CRG; source deghosting; surface related multiple attenuation; velocity model building; and depth or time imaging.

In comparison to node acquisition, 3DSA towed by wave glider acquisition differs in that node location tends to be fixed for duration of acquisition, while for a wave glider it may moves around (a small area, circle, etc.) about a station (if so desired). Knowing the location of the 3DSA at a particular time or times, it can be possible during the processing to relocate the 3DSA data to the desired location using the pressure gradients derived in x, y and z directions. Such processing capability may address receiver repeatability for 4D studies (three-dimensions and time as dimension).

As to survey design aspects for 3DSA towed by wave glider acquisition, a seismic acquisition with 3D sensor arrays towed by wave gliders can provide for various possibilities for marine acquisition due to factors such as wave glider capabilities to navigate, at a slow speed, in a circle around a defined station ("holding" station) and/or to move along a pre-defined path. Such features may allow for one or more different types of acquisition geometries to be implemented.

An Ocean Bottom Node (OBN) type geometry implemented with 3DSA towed by wave gliders can be beneficial in that it does not demand use of a Remote Operating Vehicle (ROV) for the deployment and the retrieval of nodes. Once shots are acquired for a given source patch, the wave glider (receiver) patch can move to a new patch location. Such an approach can reduce operational cost.

A type of geometry can be defined by considering a patch of wave gliders towing 3D sensor arrays that could be stationary at one location, recording data for a period of time, and after that, moves to the next location, along a pre-defined path. A dimension of a receiver patch and sampling of the receivers inside the patch can be calculated based on the fold and maximum offset. A source patch can be defined to cover a subsurface target area where it is desired to acquire full-azimuth data with the maximum offset. A number of centers of source circles and the interval between circles can be determined based on the fold.

Figure 13:
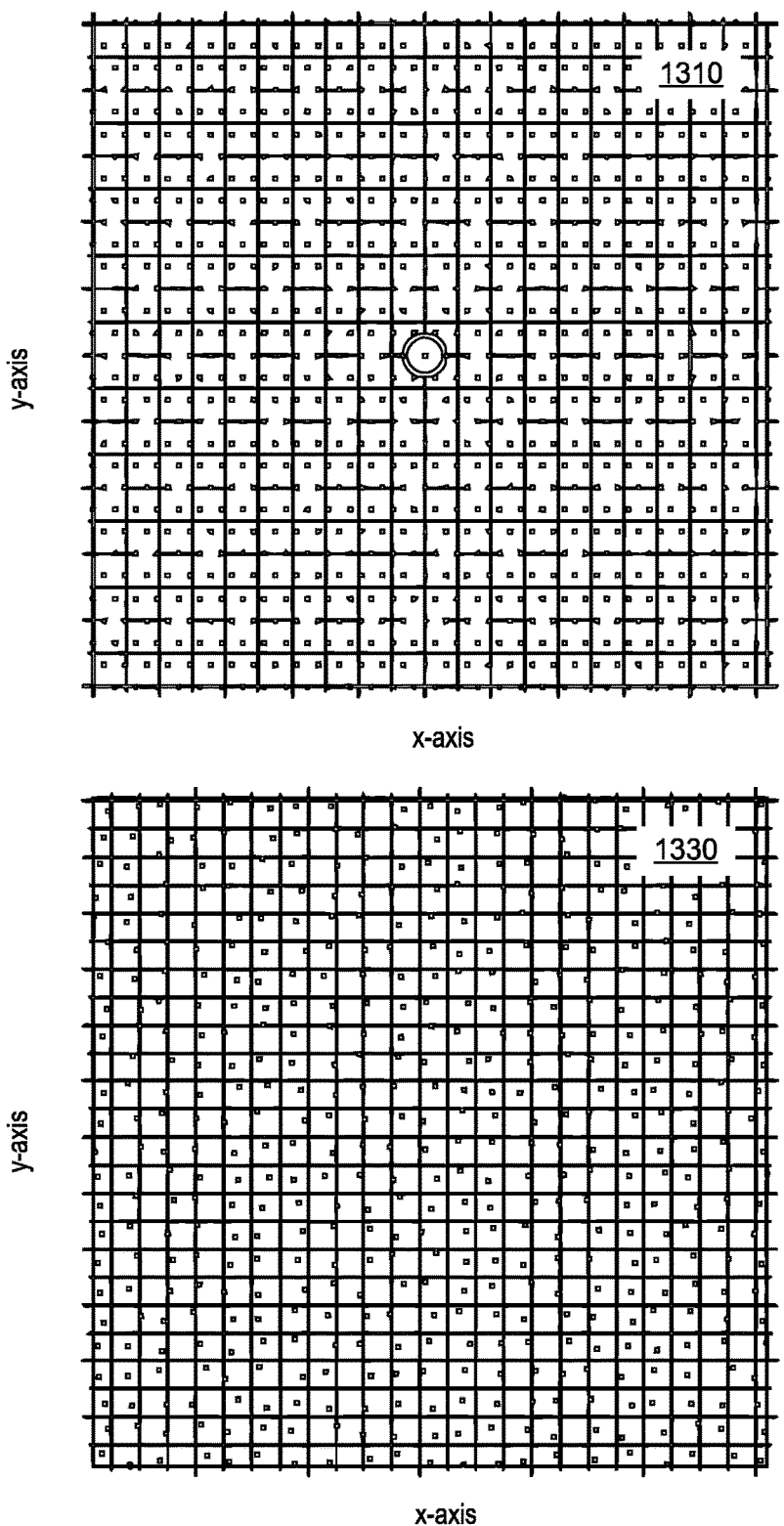
FIG. 13 illustrates plots of a receiver patch with different source locations in a seismic survey area.

FIG. 13 shows plots 1310 and 1330 of a receiver patch and a source circle in a center of the patch (plot 1310) and centers of source circles, for an entire survey area (plot 1330). A receiver patch can move from center to center to cover an entire source patch. Such a type of survey design (versus a regular node type survey design) can provide for more uniformity in offset and azimuth distribution and may provide for reduced operational cost.

Again, in FIG. 13, the plot 1310 corresponds to receiver patch (dots) and source (circle) and the plot 1330 corresponds to centers of the source circles (dots). A receiver patch (or patches) can move from center to center and record the data generated along the source circles.

A three dimensional sensor array can include hydrophones that acquire information that allows for calculation of the first pressure spatial derivative (pressure gradient) and of the second pressure spatial derivative. Such an approach may implement a finite difference approach for a recorded pressure wavefield.

As mentioned, a 3D sensor array (3DSA) can include collocated hydrophones and pressure gradient sensors, as shown as being an option in the 3D sensor array 750 of FIG. 7. Such an array can measure the pressure gradient directly and can allow for performing more accurately receiver deghosting and estimation of the second pressure spatial derivative.

A 3D sensor array with hydrophones and pressure gradient sensors can allow for combining pressure gradient data with hydrophone data to perform receiver deghosting, which can involve converting recorded pressure gradients to particle velocities Vx, Vv and Vz expressed in pressure units equivalent:

$$Vx = w_v \int \text{grad} x \, dt$$

$$Vy = w_v \int \text{grad} y \, dt$$

$$Vz = w_v \int \text{grad} z \, dt$$

where $w_v$ is water velocity, and gradx, grady, and gradz are the recorded pressure gradient in x, y and z directions.

Based on pressure measurements and pressure gradient measurements, a PZ summation type algorithm can be implemented for receiver deghosting: PZsum=0.5*(P+Vz).

The PZsum algorithm is a model-independent deghosting method that estimates the upgoing wavefield as the average of the noisy $P_n$ and $Z_n$ measurements:

$$\hat{U}_{PZSUM} = \frac{1}{2}\left(P_n + \frac{2\pi f}{ck_z}V_{z_n}\right)$$

The PZsum algorithm uses a small subset of propagation parameters, namely the density of the medium and the acoustic speed of sound in water to compute the obliquity factor. Such an approach can be insensitive to the ghost model. The PZsum algorithm ignores noise statistics on pressure and particle motion measurements.

PZsum values may be calculated for available sensor locations and averaged after that to increase the signal-to-noise ratio. Such a PZsum approach can be practical point, but may not handle (generally moderate) directional effects.

A method can include receiver deghosting of data acquired with a 3DSA using the Wavefield Parametric Inversion (WPI) approach developed for VSP data processing (see Leaney, Parametric Wavefield Decomposition And Applications, 1990 SEG Annual Meeting, 23-27 September, San Francisco, Calif., which is incorporated by reference herein, and Scott et al., Parametric Decomposition of Offset VSP Wave Fields, 1989 SEG Annual Meeting, 29 October-2 November, Dallas, Tex., which is incorporated by reference herein).

A method can include an equation that relates up and down-going waves (U,D) at a location on a 3DSA, which may be a center of the 3DSA frame or frames, to the i-th recorded data $P_i$ located at $r_i$ in the 3DSA with unknown slowness vector $p_{up}=(p_x, p_y, -p_z)$ and $p_{down}=(p_x, p_y, p_z)$ dependent phase shift operators:

$$P_i = Ue^{-j\omega \overline{p_{up}} r_i} + De^{-j\omega \overline{p_{down}} r_i}$$

Data quantities are frequency ω dependent and a system involving hydrophones alone may be solved with the following approach: use the dispersion relation and find the slowness vector that best explains the observed data (via a scan, etc.), and invert in a least-squares sense the corresponding system to output the deghosted wavefield. Applying such a method to a data window around the first breaks yields the propagation direction (azimuth) of the wavefield for each source/glider pair in the 3DSA frame. After rotating these directions to the (North, East) frame, the comparison with the source-to-float directions (output from navigation) is reasonable for most of the shots. Caprioli et al., Processing considerations for seismic data acquired with wave gliders towing a 3D sensor array, SEG Technical Program Expanded Abstracts 2016 (pp. 235-239) is incorporated by reference herein. Caprioli et al., Combination of multi-component streamer pressure and vertical particle velocity: theory and application to data, SEG Technical Program Expanded Abstracts 2012 (pp. 1-5) is also incorporated by reference herein.

As mentioned, where pressure gradient sensors are included in a 3DSA along with hydrophones, additional information is available that can be utilized for deghosting.

A method can consider hydrophone data recorded by a 3DSA to be a sum of an assumed known and small number of plane waves. Such an approach can exploit the three dimensional hydrophone layout available in a 3DSA to invert the intra-array travel times in terms of polarization attributes or wavefield propagation directions, which then leads to 3D directional up/down-going wavefield decomposition in the water (3D receiver deghosting). With additional pressure gradient measurements, such an inversion can be further constrained as both gradients and intra-array travel time information can be explained with a set of plane waves. Also with additional measurements, a larger number of plane waves may be searched for and identified.

A method may implement a ghost model independent approach such as PZsum or WPI. Where a method includes recording of pressure gradients, one or more ghost model dependent approaches may be implemented. A method can include quality controlling recording depth multi-component measurements or up/down-going decomposed wavefields. One or more of such processing techniques may be applied to data recorded with a 3DSA.

A method may utilize pressure gradient recordings, or particle motion/velocity recordings, to directly extract wavefield propagation direction attributes using one or more multi-component polarization techniques.

A method may include acquiring data via a 3D sensor array that includes hydrophones collocated with pressure gradient sensors where the pressure gradient is measured in three directions at each sensor location, which can allow for calculation (estimation) of a second derivative of the pressure gradient vector in three directions, which is the Hessian of the recorded pressure wavefield:

$$\text{Grad\_xx}\_i\_j = (\text{grad}\_x\_i - \text{grad}\_x\_j)/dx; dx=1m$$

$$\text{Grad\_yx}\_i\_j = (\text{grad}\_y\_i - \text{grad}\_y\_j)/dx; dx=1m$$

$$\text{Grad\_zx}\_i\_j = (\text{grad}\_z\_i - \text{grad}\_z\_j)/dx; dx=1m$$

for (i=1,j=2), (i=3,j=4), (i=5,j=6), (i=7, j=8)

where grad_x, grad_y and grad_z are measured pressure gradient at each sensor location.

$$\text{Grad\_xy}\_i\_j = (\text{grad}\_x\_i - \text{grad}\_x\_j)/dy; (i=6,j=7); (i=5, j=8); dy=1m$$

$$\text{Grad\_yy}\_i\_j = (\text{grad}\_y\_i - \text{grad}\_y\_j)/dy; (i=6,j=7); (i=5, j=8); dy=1m$$

$$\text{Grad\_zy}\_i\_j = (\text{grad}\_z\_i - \text{grad}\_z\_j)/dy; i=6,j=7; i=5,j=8; dy=1m$$

$$\text{Grad\_xz}\_i\_j = (\text{grad}\_x\_i - \text{grad}\_x\_j)/dz; i=2,j=3; i=1, j=4; dz=1m$$

Grad_yz_i_j=(grad_y_i−grad_y_j)/dz;i=2;j=3;i=1; j=4;dz=1m

Grad_zz_i_j=(grad_z_i−grad_z_j)/dz;i=2;j=3;i=1; j=4;dz=1m

Such quantities may be incorporated to a WPI scheme which then makes use of the hydrophones, pressure gradient measurements, and the calculated second derivatives. Such an approach can provide for more accurate receiver deghosting. The analysis of the 2nd order spatial derivatives of the recorded wavefield or the Hessian matrix (via eigenvalue decomposition) can be performed to gain additional insight into a wavefield.

A 3DSA may be implemented to acquire data where accurate derivation of the direction of the seismic arrival can be determined. A 3DSA may be implemented where positioning quality control may be performed. A 3DSA may be implemented for relocation and re-datuming of the 3DSA from one point, r, to another nearby point, r+r, (which may be to a nominal fixed location) which can be based on a Taylor expansion of the recorded pressure wavefield involving its first and second pressure spatial derivatives:

$$P(r+r) \approx P(r) + \nabla P(r)^T \cdot r + \frac{1}{2} r^T H r$$

where $\nabla P$ is the recorded pressure gradient and H the computed second order pressure gradient or Hessian (as described above). Here $\nabla$ and T denote the gradient and transpose operators, respectively.

A pressure gradient sensor may be a motion type of sensor, such as accelerometers. Other types of pressure gradient sensors may be insensitive to motion and may reduce noise (be less noisy). One or more types of pressure gradient sensors can be used in a 3D sensor array.

Hallock et al., Resonant transducers for solid-state plasma density modulation, Rev Sci Instrum. 2016 April; 87(4) is incorporated by reference herein and describes transducers capable of modulating plasma density and plasma density gradients in indium antimonide. Such transducers make use of piezoelectric drivers to excite acoustic pressure resonance at $3\lambda/2$, generating large amplitude standing waves and plasma density modulations. Such transducers can be fabricated from InSb wafers. Wafers can be 3 mm thick and polished on both sides. Cuts can be made parallel and perpendicular to the primary flat, using a wafer dicing saw. A piezoelectric driver can be mated to one end of the InSb using high strength epoxy. A piezoelectric material can be Navy Type I (PZT-4) lead zirconate titanate piezoelectric ceramic. In addition to the main $3\lambda/2$ resonance, other modes are possible. Another type of transducer can include two layers of fused silica in addition to the InSb and PZT driver (InSb-FS transducer), which may generate a pressure gradient in a single direction in the InSb plasma.

Acquisition with 3D sensor arrays can be utilized in applications in the areas where quality of seismic data acquired with OBN or OBC systems may be deemed to be inadequate due to factors such as sea floor conditions or in very deep waters where the ocean bottom systems cannot be deployed.

Equipment such as the equipment of FIGS. 6 and 7 may be utilized in a manner that can complement towed streamer acquisition, consider a scenario to acquire efficiently seismic data around obstructions, and long and ultra-long offsets. Joint processing of towed streamer data and 3DSA data may be performed as both systems can be based on hydrophone measurements. An application can entail acquiring 3DSA data during a 3D VSP survey or a walkaway survey.

Multi-hydrophone measurements can provide various options as to signal processing and in imaging of 3DSA data. Consider one or more of receiver deghosting, detection of the direction of the seismic arrivals, QC of the positioning based on seismic data, wavefield interpolation or extrapolation, and vector acoustic imaging.

A survey may employ a number of units. A survey may employ hundreds of wave gliders. In such a survey, wave gliders can include communication circuitry and/or anti-collision circuitry. Units may communicate between themselves and/or with a master vessel. Data can be downloaded, optionally in a manner that does not impact production.

Where a fleet or a swarm of gliders is utilized (each including at least one 3DSA), communication between gliders and/or each glider and a master ship may provide for spacing control, anti-collision control, etc. Communication may be via WiFi communication circuitry (based on IEEE 802.11 standards) with communications being made at time intervals of the order of seconds or minutes where distances between gliders may be from about meters to a few hundreds of meters.

A glider can include a main computer and a data acquisition system that handles data acquisition system from a 3DSA or one or more 3DSAs that are operatively coupled to the glider (see FIG. 6).

Figure 14:
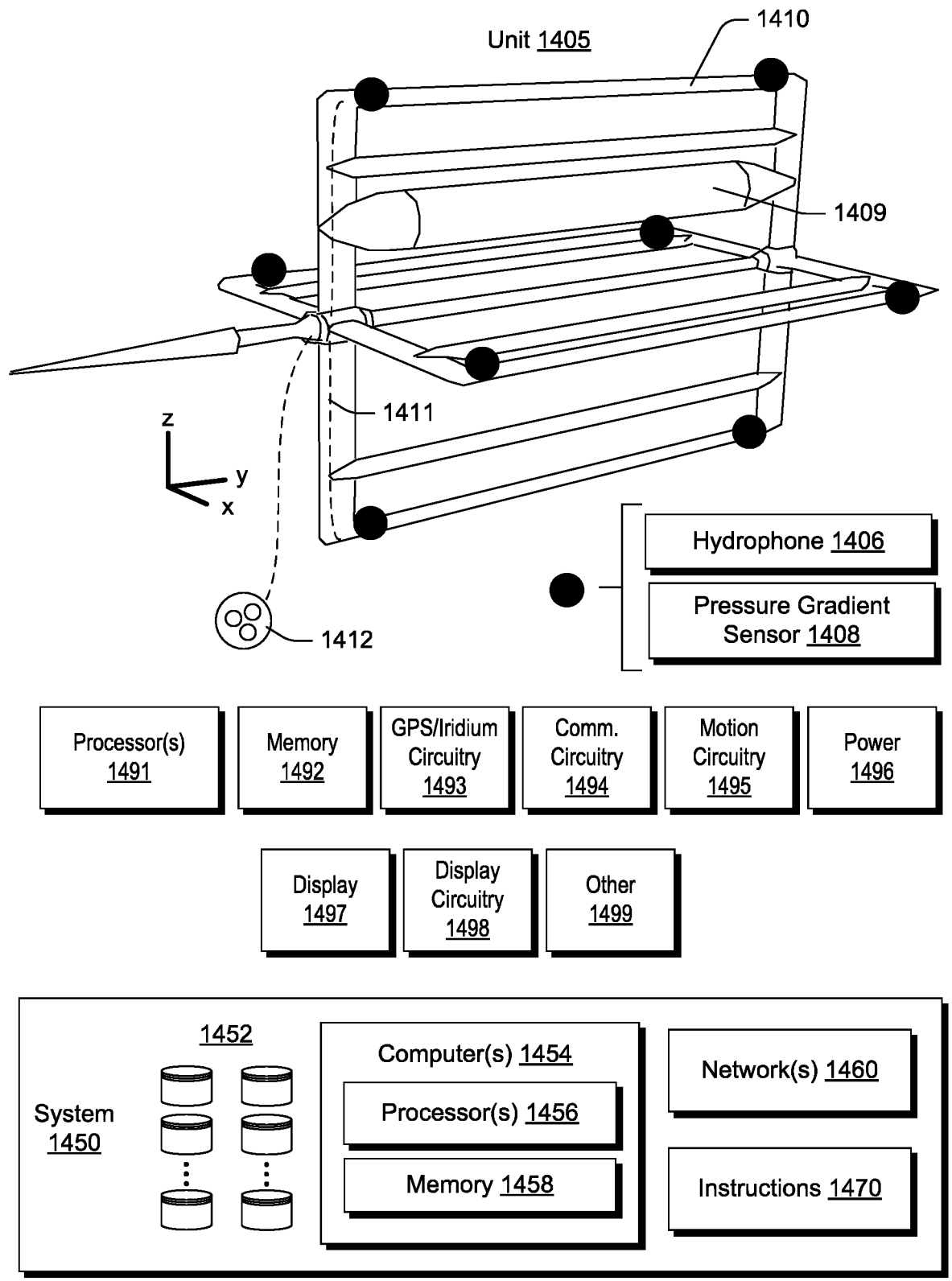
FIG. 14 illustrates a diagram of a 3D sensor array unit with associated circuitry and a system for processing seismic data acquired by the 3D sensor array unit.

FIG. 14 shows a unit 1405 (or system) that includes arms 1410, hydrophones 1406 and/or pressure gradient sensors 1408 and a buoyancy engine 1409 and also shows a system 1450. The unit 1405 can include a bus 1411 (data and/or power bus) that can be operatively coupled to an interface 1412 that can be operatively coupled to a cable (see the cable 640 of FIG. 6), which may be a data and/or a power cable. The unit 1405 may include an underwater beacon (see the underwater beacon 751 of FIG. 7). Equipment of the unit 1405 may be powered via one or more power sources and may be operatively coupled to a bus interface and/or a network interface for transmission of information and optionally for receipt of information. The unit 1405 can include one or more connectors for connecting a cable or cables.

A unit may be bi-directional or uni-directional. A bi-directional unit can include two interfaces, which may be connectors and interfaces for connecting a cable. A connector for a cable can be along a central longitudinal axis of a unit. The unit 1405 includes a member that extends along the central longitudinal axis. The arms 1410 can be members of a frame that includes a vertical portion and a horizontal portion that define planes that intersect along the central longitudinal axis.

The unit 1405 may be described with respect to a three-dimensional coordinate system such as a Cartesian coordinate system or a cylindrical coordinate system or a spherical coordinate system. A Cartesian coordinate system is shown where the unit 1405 can be described as including a frame that includes arms 1410 that carry hydrophones 1406 and/or pressure gradient sensors 1408 and where the buoyancy engine 1409 is operatively coupled to the frame, which may include one or more sensors and/or be operatively coupled to one or more sensors that are operatively coupled to the frame. One or more sensors and a buoyancy engine may be operatively coupled via wire and/or via wireless communication circuitry.

In FIG. 14, the unit 1405 includes sets of arms 1410 that arranged in two-planes. The buoyancy engine 1409 can include features that can control orientation of the two-planes with respect to a reference frame. In such an approach, consider a reference frame where a flat surface of water is considered to coincide with an x,y-plane with a normal in the z-direction. The buoyancy engine 1409 can control pitch, yaw and roll of the unit 1405 with respect to such a reference frame. The buoyancy engine can control z-position (depth) of the unit 1405.

A buoyancy engine can control, based on one or more sensed parameters, one or more of pitch, yaw and roll and can control depth. Such a buoyancy engine may aim to maintain a particular orientation of a unit at least in part during an acquisition phase. During a movement phase, which may be to move a unit to another location, a buoyancy engine may adjust orientation to an orientation that facilitates movement in water (and/or air).

In FIG. 14, the unit 1405 includes a plane y,z and a plane x,y. Equipment disposed substantially in such planes may be orthogonal to each other and can include one or more sensors (hydrophones, pressure gradient sensors and/or one or more other types of sensors).

The unit 1405 can include one or more processors 1491, memory 1492, GPS/Iridium circuitry 1493, communication circuitry 1494, motion circuitry 1495 (motion sensing circuitry and/or position sensing circuitry), power 1496 (power circuitry, a battery, etc.), optionally a display 1497, optionally display circuitry 1498 and other circuitry or components 1499. Circuitry may include one or more of hardware, software, firmware, etc. A glider and/or a sub may include one or more of the blocks 1491 to 1499.

As shown in FIG. 14, the system 1450 includes one or more information storage devices 1452, one or more computers 1454, one or more networks 1460 and instructions 1470. As to the one or more computers 1454, each computer may include one or more processors (or processing cores) 1456 and memory 1458 for storing instructions 1470, which may be executable by at least one of the one or more processors 1456. A computer may include one or more network interfaces (wired or wireless), one or more graphics cards, a display interface (wired or wireless), etc. Imagery such as surface imagery (satellite, geological, geophysical, etc.) may be stored, processed, communicated, etc. Data may include SAR data, GPS data, etc. and may be stored in one or more of the storage devices 1452.

The unit 1405 may include one or more features of the system 1450 and/or include circuitry that can transmit information to such a system and/or receive information from such a system. A glider and/or a sub may include one or more features of the system 1450.

The instructions 1470 may include instructions (stored in memory) executable by one or more processors to instruct the system 1450 to perform various actions.

The unit 1405 can include one or more chambers, one or more movable weights, etc. Such features may be controllable via the buoyancy engine 1409 to control orientation of the unit or one or more portions thereof. A chamber may be a fluid chamber for gas and/or liquid. A mechanism may be passive and/or active for adjusting matter that can cause an adjustment in orientation and/or depth of a unit.

A unit may include streamlined features that facilitate desirable movement in water (for transport from one location to another).

Figure 15:
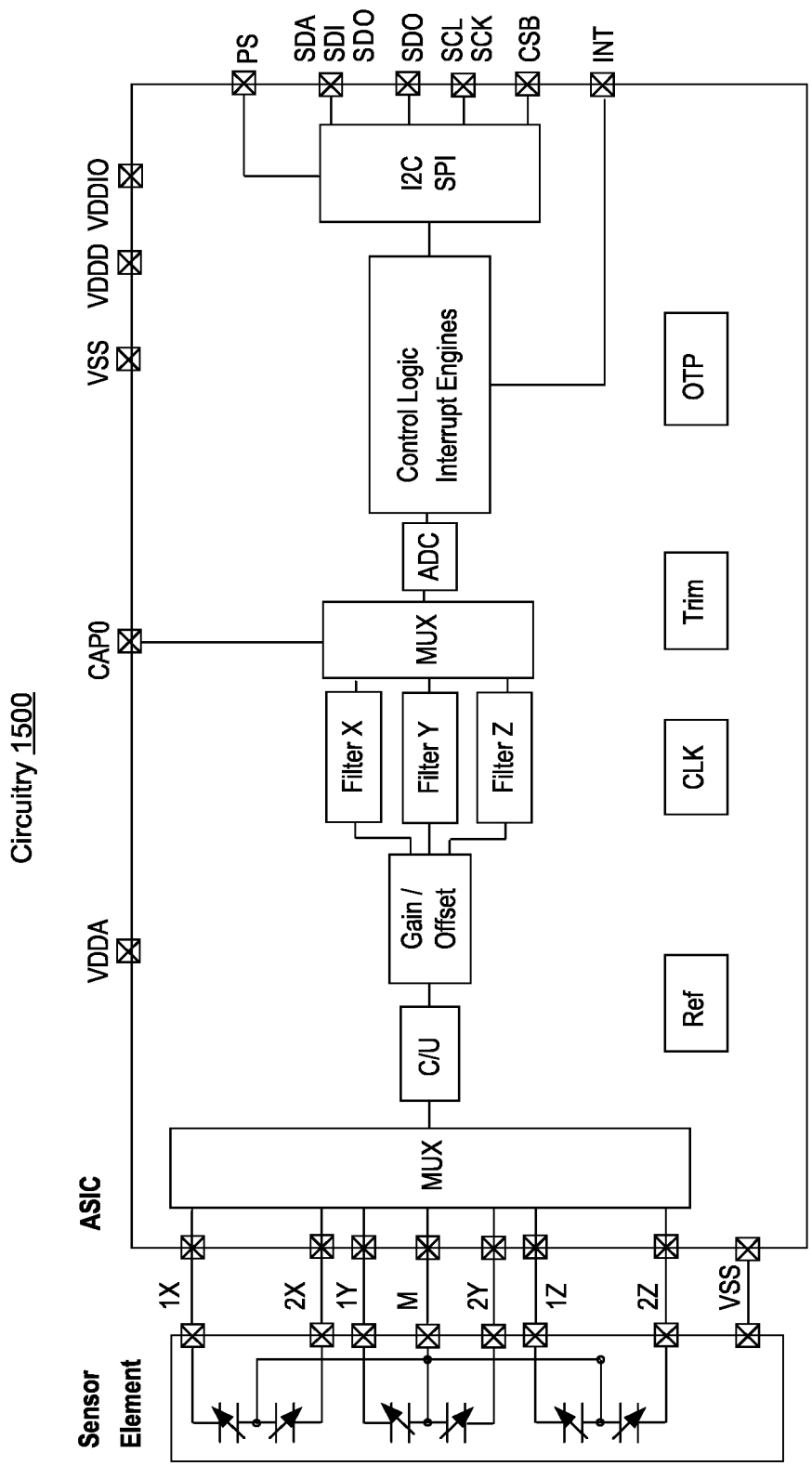
FIG. 15 illustrates a diagram of circuitry that includes motion sensing circuitry.

FIG. 15 shows circuitry 1500 that includes motion sensing circuitry. In particular, a sensor element is shown that includes x, y and z sensing circuits, which may be accelerometer circuits. The x, y and z sensing circuits may correspond to x, y and z coordinates as illustrated in FIGS. 2 and 3 or as illustrated in FIG. 7 or 14. A coordinate system may define yaw, roll and pitch. Yaw may be defined to be planar motion (rotation) and roll and pitch may be defined to be motion that tilts a plane (a geometrical plane), which may be a plane defined at least in part by a component of a unit. Circuitry may process information from motion sensing circuitry according to yaw, roll and pitch, to "standardize" the information in a manner that may compensate for an offset of the motion sensing circuitry from a center of a unit.

As shown in FIG. 15, the circuitry 1500 may include an I²C interface and/or an SPI interface (which may operate via receipt and/or transmission of information via one or more busses). The circuitry 1500 may include signal processing circuitry such as one or more amplifiers, multiplexers, filters, analog-to-digital converters (ADCs), control logic, interrupt engines, etc. Motion sensing circuitry may include an ASIC that is operatively coupled to one or more sensor elements. In such an arrangement, signals generated by a sensor element may be processed and transmitted as information via one or more interfaces, one or more busses, etc. A processor that can execute an application in an operating system environment (consider a real-time OS or RTOS) may receive such information, process at least a portion of the information and transmit information to control orientation of a unit.

An optimization may be performed using information about a unit (one or more of geometry, mass distribution, center of mass, etc.) to generate a model that may be constructed for the unit. Such a model may be a control model.

A marine seismic acquisition system can include a frame that includes a central longitudinal axis and members that define orthogonal planes that intersect along the central longitudinal axis; a data interface operatively coupled to the frame; hydrophones operatively coupled to the frame; a buoyancy engine operatively coupled to the frame where the buoyancy engine includes at least one mechanism that controls buoyancy of at least the frame, the hydrophones and the buoyancy engine; and at least one inertial motion sensor operatively coupled to the frame that generates frame orientation data, where the hydrophones, the buoyancy engine and the at least one inertial motion sensor are operatively coupled to the data interface. Such a system can include a tow cable connector operatively coupled to the frame where the tow cable connector may be operatively coupled to the data interface.

A marine seismic acquisition system can include at least one accelerometer. A marine seismic acquisition system can include pressure gradient sensors that can be multidimensional pressure gradient sensors. In a marine seismic acquisition system, at least some pressure gradient sensors and at least some hydrophones can be collocated with respect to the frame. In such an arrangement, a collocated pressure gradient sensor and a collocated hydrophone can have a common housing and/or a common mount or a collocated pressure gradient sensor and a collocated hydrophone can include separate housings that have a separation distance of approximately 15 cm or less or approximately 10 cm or less or approximately 5 cm or less.

A marine seismic acquisition system can include a buoyancy engine that controls depth of hydrophones with respect to a water/air interface. In such an arrangement, the buoyancy engine can include a mechanism that can include a chamber, a pump, a valve, a vent, or other type of mechanism that can control buoyancy. Buoyancy may be controlled via movement of ballast, which may be water. Ballast may be moved via one or more mechanisms with respect to one or more chambers and optionally an external environment that may include air and/or water (depending on depth of a system).

A marine seismic acquisition system can include a buoyancy engine that includes a sealed housing where at least one inertial motion sensor is disposed within the sealed housing.

A MEMS gyroscope can be used to sense rotational motion. A gyroscope may be integrated in an IMU (inertial measurement unit) that embeds a multi-axis gyroscope and multi-axis accelerometer. An IMU can include a multi-axis accelerometer and a multi-axis gyroscope and optionally a mult-iaxis magnetometer. An IMU may provide information as to 6 degrees of freedom (6DoF).

A marine seismic acquisition system can include location circuitry. A marine seismic acquisition system can include an underwater beacon operatively coupled to a frame.

A marine seismic acquisition system can include a cable operatively coupled to a frame where a wave glider may be operatively coupled to the cable.

A frame can include orthogonal planar sub-frames. A frame can include members. Hydrophones may be mounted to members of a frame. Hydrophone sensors (hydrophones) and pressure gradient sensors may be mounted to members of a frame where the sensors are collocated at a location of a frame such that a hydrophone seismic signal at the location of the frame can be associated with pressure gradient information at the location of the frame. Such pressure gradient sensor information can be multi-dimensional as to gradients in multiple dimensions.

A Cartesian coordinate system can have x, y and z axes where a frame of a system includes a portion that extends in a x,y-plane and a portion that extends in a y,z-plane. A central longitudinal axis of the frame can be along the x axis of the Cartesian coordinate system. A member of a frame or members of a frame may be straight and/or curved. A frame can include members where at least one member may be curved. Sensor locations (hydrophones or hydrophones collocated with multi-dimensional gradient sensors) can define a sensor array, which may have two planes that are orthogonal. In such an arrangement, a frame may be of a shape that allows for locating the sensors of the sensor array accordingly.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A marine seismic acquisition system comprising:
   a frame that comprises a first set of members that defines a first plane and a second set of members that defines a second plane that is orthogonal to the first plane and that intersects the first plane along a central longitudinal axis;
   a data interface operatively coupled to the frame;
   hydrophones and pressure spatial gradient sensors mounted to the frame, wherein the pressure spatial gradient sensors measure pressure spatial gradients;
   a buoyancy engine that comprises a chamber that is coupled to the first set of members and offset from the central longitudinal axis, wherein the buoyancy engine comprises at least one mechanism that controls buoyancy of at least the frame, the hydrophones, the pressure spatial gradient sensors and the buoyancy engine; and
   at least one inertial motion sensor operatively coupled to the frame that generates frame orientation data, wherein the hydrophones, the pressure spatial gradient sensors, the buoyancy engine and the at least one inertial motion sensor are operatively coupled to the data interface.

2. The marine seismic acquisition system of claim 1 comprising a tow cable connector.

3. The marine seismic acquisition system of claim 2 wherein the tow cable connector is operatively coupled to the data interface.

4. The marine seismic acquisition system of claim 1 comprising at least one accelerometer.

5. The marine seismic acquisition system of claim 1 wherein at least some of the pressure spatial gradient sensors and at least some of the hydrophones are collocated with respect to the frame.

6. The marine seismic acquisition system of claim 5 wherein a collocated pressure spatial gradient sensor and a collocated hydrophone comprise a common housing.

7. The marine seismic acquisition system of claim 5 wherein a collocated pressure spatial gradient sensor and a collocated hydrophone comprise separate housings that have a separation distance of approximately 15 cm or less.

8. The marine seismic acquisition system of claim 1 wherein the buoyancy engine controls depth of the hydrophones with respect to a water/air interface.

9. The marine seismic acquisition system of claim 8 wherein the at least one mechanism that controls buoyancy comprises a fluid chamber.

10. The marine seismic acquisition system of claim 1 wherein the buoyancy engine comprises a sealed housing and wherein the at least one inertial motion sensor is disposed within the sealed housing.

11. The marine seismic acquisition system of claim 1 comprising global navigation satellite system location circuitry, and an underwater beacon operatively coupled to the frame.

12. The marine seismic acquisition system of claim 1 comprising a cable operatively coupled to the frame, and a wave glider operatively coupled to the cable.

13. The marine seismic acquisition system of claim 1 wherein the hydrophones are mounted to the first set of members and the second set of members.

14. The marine seismic acquisition system of claim 1 wherein in a Cartesian coordinate system having x, y and z axes, the first set of members define a x,y-plane and the second set of members define a y,z-plane, wherein the central longitudinal axis is along the x axis of the Cartesian coordinate system.

15. The marine seismic acquisition system of claim 1 wherein the first set of members or the second set of members comprises at least one curved member.

16. A method, comprising:
controlling a marine seismic acquisition system to:
- acquire seismic data from a plurality of hydrophones and pressure spatial gradient sensors mounted to a frame, wherein the frame comprises a first set of members that defines a first plane and a second set of members that defines a second plane that is orthogonal to the first plane and that intersects the first plane along a central longitudinal axis, wherein the pressure spatial gradient sensors measure pressure spatial gradients;
- control buoyancy via a buoyancy engine that comprises a chamber that is coupled to the first set of members and offset from the central longitudinal axis, wherein the buoyancy engine is configured to control the buoyancy of at least the frame, the plurality of hydrophones and pressure spatial gradient sensors, and the buoyancy engine; and
- generate frame orientation data via at least one inertial motion sensor operatively coupled to the frame, wherein the plurality of hydrophones and pressure spatial gradient sensors, the buoyancy engine, and the at least one inertial motion sensor are operatively coupled to a data interface.

17. The marine seismic acquisition system of claim 1 wherein the buoyancy engine controls pitch, yaw and roll of the frame.

* * * * *

UNITED STATES PATENT AND TRADEMARK OFFICE
CERTIFICATE OF CORRECTION

PATENT NO. : 11,333,778 B2  
APPLICATION NO. : 16/089039  
DATED : May 17, 2022  
INVENTOR(S) : Nicolae Moldoveanu Page 1 of 1

It is certified that error appears in the above-identified patent and that said Letters Patent is hereby corrected as shown below:

On the Title Page

Item (73) Assignee:  
Replace "WesternGeco L.L.C., Houston, TX (US)"  
With --Schlumberger Technology Corporation, Sugar Land, TX (US)--

Signed and Sealed this  
Sixth Day of September, 2022

Katherine Kelly Vidal  
*Director of the United States Patent and Trademark Office*